United States Patent
Sekine

(10) Patent No.: US 10,618,560 B2
(45) Date of Patent: Apr. 14, 2020

(54) FUEL CELL VEHICLE

(71) Applicant: TOYOTA JIDOSHA KABUSHIKI KAISHA, Toyota-shi, Aichi-ken (JP)

(72) Inventor: Hiroyuki Sekine, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 167 days.

(21) Appl. No.: 15/895,310

(22) Filed: Feb. 13, 2018

(65) Prior Publication Data

US 2018/0229771 A1    Aug. 16, 2018

(30) Foreign Application Priority Data

Feb. 14, 2017  (JP) ................................ 2017-024993

(51) Int. Cl.
| | | |
|---|---|---|
| *B62D 21/15* | (2006.01) | |
| *B60K 1/00* | (2006.01) | |
| *B60K 1/04* | (2019.01) | |
| *B62D 29/00* | (2006.01) | |

(52) U.S. Cl.
CPC .............. *B62D 21/152* (2013.01); *B60K 1/00* (2013.01); *B60K 1/04* (2013.01); *B62D 29/008* (2013.01); *B60K 2001/0411* (2013.01); *B60Y 2306/01* (2013.01)

(58) Field of Classification Search
CPC .......................... B62D 21/152; B60Y 2306/01
See application file for complete search history.

(56) References Cited

U.S. PATENT DOCUMENTS

| | | | |
|---|---|---|---|
| 9,333,845 B2* | 5/2016 | Winter | B60K 1/04 |
| 9,586,499 B2* | 3/2017 | Fushimi | B60L 58/30 |
| 2007/0215397 A1* | 9/2007 | Suzuki | B60K 1/00 180/65.31 |
| 2012/0015257 A1* | 1/2012 | Arisawa | B60K 1/04 429/400 |
| 2014/0110185 A1 | 4/2014 | Naito et al. | |
| 2019/0152548 A1* | 5/2019 | Shimizu | B62D 65/12 |

FOREIGN PATENT DOCUMENTS

| | | |
|---|---|---|
| JP | 2009-190438 | 8/2009 |
| JP | 2014-76716 | 5/2014 |
| JP | 2014-83875 | 5/2014 |
| JP | 2014-86171 | 5/2014 |

\* cited by examiner

*Primary Examiner* — Brian L Swenson
(74) *Attorney, Agent, or Firm* — Finnegan, Henderson, Farabow, Garrett & Dunner, LLP

(57) ABSTRACT

A fuel cell vehicle includes a first high-voltage unit and a second high-voltage unit in a front compartment. The first high-voltage unit includes a first case including a body portion, and a projecting portion that projects from an outer surface of the body portion, and is located between a pair of suspension towers, and between a dashboard panel and a front bumper. The second high-voltage unit is placed in space between one of the suspension towers and the dashboard panel. The projecting portion projects toward the one suspension tower, and at least a part of the projecting portion is located on the front side in the traveling direction, relative to a straight line connecting center axes of the suspension towers, as viewed from the top of the vehicle.

11 Claims, 14 Drawing Sheets ns entirety

FUEL CELL VEHICLE

INCORPORATION BY REFERENCE

The disclosure of Japanese Patent Application No. 2017-024993 filed on Feb. 14, 2017 including the specification, drawings and abstract is incorporated herein by reference in its entirety

BACKGROUND

1. Technical Field

The disclosure relates to a fuel cell vehicle.

2. Description of Related Art

As one type of fuel cell vehicle installed with a fuel cell, a vehicle is known in which high-voltage devices, such as a fuel cell, drive motor, and a fuel cell voltage control unit, are placed within a front compartment (see, for example, Japanese Patent Application Publication No. 2014-076716 (JP 2014-076716 A), Japanese Patent Application Publication No. 2009-190438 (JP 2009-190438 A), Japanese Patent Application Publication No. 2014-086171 (JP 2014-086171 A), and Japanese Patent Application Publication No. 2014-083875 (JP 2014-083875 A)). Generally, the high-voltage devices placed within the front compartment are stored in a case, so that the devices are less likely to be damaged due to collision, or the like, of the vehicle.

SUMMARY

However, in the case where two or more high-voltage devices are placed within the front compartment, a high-voltage device on the front side in the input direction of a collision load, for example, may collide with a high-voltage device on the rear side, at the time of a collision of the vehicle, whereby the device on the rear side may be damaged. For example, the case that stores the high-voltage devices is generally provided with sufficient rigidity and strength, so that the high-voltage devices are prevented from being exposed to the exterior even when receiving an impact at the time of collision, or the like, of the vehicle. Thus, the possibility of damaging the high-voltage devices stored in the case at the time of collision, or the like, may be reduced by increasing the rigidity and strength of the case. However, if the rigidity and strength of the case are increased, the force of impact applied at the time of collision from the high-voltage devices stored in the case to other high-voltage devices located on the rear side in the direction of application of the collision load may be increased.

In order to enhance the safety of the vehicle at the time of collision, it is desirable to curb or prevent damage of the high-voltage device or devices due to collision between the high-voltage devices arranged in the longitudinal direction within the front compartment. However, the arrangement for curbing damage of the rear high-voltage device due to collision between the high-voltage devices has not been sufficiently studied. The problem of damage of the high-voltage device caused by collision between the high-voltage devices at the time of collision of the vehicle occurs not only in the case where the fuel cell and the drive motor are placed in the front compartment, but also in the case where two or more high-voltage units are placed in the front compartment.

In connection with the fuel cell vehicle of the related art, reduction of the fuel consumption through reduction of the weight of the vehicle, improvement of the manufacturing efficiency of the vehicle, reduction of the manufacturing cost, occupant protection of the vehicle, etc. have also been desired.

This disclosure has been developed so as to solve at least a part of the problems as described above, and can be realized in the following forms.

According to one aspect of the disclosure, a fuel cell vehicle installed with a fuel cell is provided. The fuel cell vehicle includes a first high-voltage unit having a first high-voltage device and a first case, and a second high-voltage unit having a second high-voltage device. The first case includes a body portion having a space in which the first high-voltage device is stored, and a projecting portion that projects from an outer surface of the body portion. The first high-voltage unit and the second high-voltage unit are housed in a front compartment of the fuel cell vehicle. The first high-voltage unit is located between a pair of suspension towers, and between a dashboard panel and a front bumper. The suspension towers support upper end portions of front suspensions that support front wheels of the fuel cell vehicle. The second high-voltage unit is located in space between one of the suspension towers and the dashboard panel. The projecting portion projects toward the one of the suspension towers, and at least a part of the projecting portion is located on a front side in a traveling direction of the fuel cell vehicle, relative to a straight line connecting center axes of the suspension towers, as viewed from the top of the vehicle. With the fuel cell vehicle according to the above aspect of the disclosure, even when a collision load that would cause a situation where the first high-voltage unit attacks the second high-voltage unit is applied, the first high-voltage unit is less likely or unlikely to collide with the second high-voltage unit, and the force of impact can be alleviated even if the collision occurs. As a result, damage of the second high-voltage unit due to collision with the first high-voltage unit can be reduced or prevented. More specifically, even if the first high-voltage unit moves in response to the collision load, the projecting portion collides with one of the suspension towers, so that further movement of the first high-voltage unit is restricted, and the first high-voltage unit is less likely or unlikely to collide with the second high-voltage unit.

In the fuel cell vehicle according to the above aspect, the first case may have a chamfered portion in a rear end portion as viewed in the traveling direction, on a first side close to the one of the suspension towers. The chamfered portion may be located inside a shape provided by extending side faces of the first case close to the first side of the rear end portion. With the fuel cell vehicle thus constructed, the effect of curbing damage of the second high-voltage unit due to collision with the first high-voltage unit can be further enhanced.

In the fuel cell vehicle according to the above aspect, the first case may further include a protrusion that protrudes rearward in the traveling direction. The protrusion may be located in a rear end portion of the first case as viewed in the traveling direction, on a second side close to the other of the suspension towers. With the fuel cell vehicle thus constructed, when the first high-voltage unit to which a collision load is applied moves, the protrusion collides with the dashboard panel. Therefore, the effect of stopping the first high-voltage unit at the time of collision of the vehicle can be further enhanced.

In the fuel cell vehicle as described above, the protrusion may be provided above a vertically middle portion of the first case. With this arrangement, the first high-voltage unit can be dug into the dashboard panel at a high position or level at the time of collision of the vehicle. Generally, the vehicle cabin is present behind the dashboard panel, and various equipments are located on the upper part of the dashboard panel on the vehicle cabin side. Therefore, at the upper part of the dashboard panel, a larger distance is secured between the dashboard panel and the vehicle cabin, as compared with that at the lower part of the panel. Accordingly, if the protrusion is provided on the upper part of the first case as described above, the occupant protection performance at the time of collision of the fuel cell vehicle can be enhanced.

In the fuel cell vehicle according to the above aspect, the projecting portion may be provided at a position that overlaps, in a horizontal direction, with a region closest to the first high-voltage unit, in an upper-end corner portion of the one of the suspension towers having a columnar shape. With this arrangement, the projecting portion is likely to collide with the upper-end, corner portion of the above-indicated one suspension tower having the highest rigidity, at the time of collision of the vehicle. Accordingly, the force with which the first high-voltage unit is stopped by the above-indicated one suspension tower at the time of collision of the vehicle can be further increased, and the operation to restrict movement of the first high-voltage unit can be performed with further enhanced reliability.

In the fuel cell vehicle according to the above aspect, the projecting portion may include a distal end portion having a flat surface parallel to the traveling direction and a vertical direction. With this arrangement, it is possible to provide a larger area of the projecting portion that can contact (or collide) with the above-indicated one suspension tower at the time of collision of the vehicle. Accordingly, even when a moving state of the first high-voltage unit at the time of collision of the vehicle varies, the effect of stopping movement of the first high-voltage unit by means of the above-indicated one suspension tower can be ensured.

In the fuel cell vehicle according to the above aspect, the projecting portion may be made of aluminum or an aluminum alloy. With this arrangement, it is possible to provide the projecting portion with a sufficient strength, while suppressing increase of the weight of the high-voltage unit due to provision of the projecting portion.

In the fuel cell vehicle according to the above aspect, the projecting portion and the body portion may be separate members. With this arrangement, when the relative positional relationship between the first high-voltage unit and the one suspension tower is changed, such as when the first high-voltage unit is applied to different vehicle types, for example, the position of the projecting portion relative to the one suspension tower can be made appropriate; merely by changing the mounting position of the projecting portion. Therefore, it is possible to easily deal with change of the vehicle type, and the manufacturing efficiency of the fuel cell vehicle can be improved.

In the fuel cell vehicle as described above, the projecting portion may have a hollow structure, and may be provided on a side face of the first case which is opposed to the one of the suspension towers. A connecting portion for contact with the projecting portion may be provided on an outer surface of the body portion, and first reinforcement ribs that protrude in a projecting direction of the projecting portion may be provided in the connecting portion. Second reinforcement ribs configured to reinforce the hollow projecting portion may be provided inside the projecting portion. End faces of the first reinforcement ribs may be in contact with end faces of the second reinforcement ribs in the connecting portion, and the end faces of the first reinforcement ribs may be substantially identical in shape with the end faces of the second reinforcement ribs. With the fuel cell vehicle thus constructed, it is possible to increase the strength of the projecting portion, and also increase the strength of the connecting portion between the projecting portion and the body portion. Also, when the projecting portion collides with the above-indicated one of the suspension towers, the force received from the suspension tower can be more efficiently transmitted from the projecting portion to the body portion side, and the effect of stopping the first high-voltage unit can be enhanced.

In the fuel cell vehicle according to the above aspect, the first high-voltage device included in the first high-voltage unit may consist of a plurality of first high-voltage devices including the fuel cell, and a high-voltage device that is supplied with electric power generated by the fuel cell. With the fuel cell vehicle thus constructed, high-voltage wires for connection with the fuel cell can be shortened, and the wiring structure can be simplified.

The chamfered portion may be provided at a corner portion of the first case that may be closest to the second high-voltage unit.

The constituent elements included in each form of the disclosure as described above are not entirely essential, but a part of the constituent element may be changed, deleted, or replaced with other new constituent elements, as needed, and a part of limiting contents may be deleted, so as to solve a part or all of the above problems, or achieve a part or all of the effects described in this specification. Also, a part or all of technical features included in one form of the disclosure as described above may be combined with a part or all of technical features included in another form of the disclosure as described above, to provide one independent form of the disclosure, so as to solve a part or all of the above problems, or achieve a part or all of the effects described in this specification.

This disclosure may be realized in various forms other than the fuel cell vehicle. For example, the disclosure may be realized as a method of placing high-voltage units in a fuel cell vehicle, or in the form of a case for high-voltage devices, for example.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. FIRST EMBODIMENT

A-1 Overall Configuration of Fuel Cell Vehicle

Figure 1:
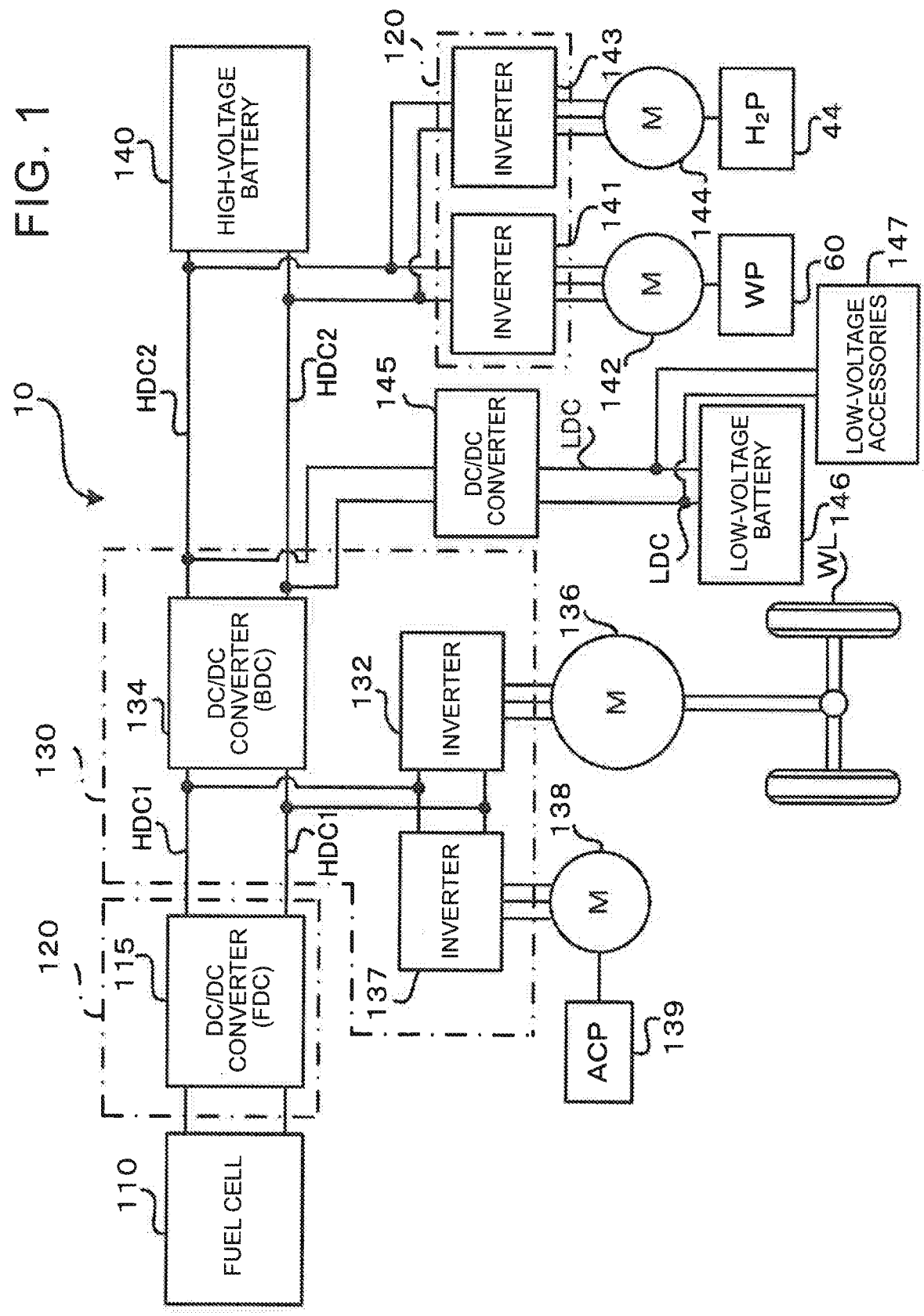
FIG. 1 is an explanatory view showing the general configuration of a fuel cell vehicle.

FIG. 1 shows the general configuration of a fuel cell vehicle 10 as a first embodiment of the disclosure. While this embodiment is characterized in the arrangement of respective parts of the fuel cell vehicle 10 shown in FIG. 1, the configuration of the whole system installed on the fuel cell vehicle 10 will be initially described.

The fuel cell vehicle 10 includes a fuel cell 110, DC/DC converter (which may be referred to as "FDC") 115, high-voltage battery 140, DC/DC converter (which may be referred to as "BDC") 134, drive motor 136, air compressor (which may be abbreviated to "ACP") 139, water pump (which may be abbreviated to "WP") 60, and a hydrogen pump (which may be abbreviated to "H$_2$P") 44. The fuel cell vehicle 10 travels while driving the drive motor 136 using electric power (electric energy), as a drive source, generated by the fuel cell 110, and the high-voltage battery 140 as a secondary battery. The air compressor (ACP) 139, water pump (WP) 60, and the hydrogen pump (H$_2$P) 44 are driven with electric power supplied from at least one of the fuel cell 110 and the high-voltage battery 140. The air compressor (ACP) 139, water pump (WP) 60, and the hydrogen pump (H$_2$P) 44 are fuel cell accessories that work during power generation of the fuel cell 110, and cooperate with the fuel cell 110 to provide a fuel cell system 15.

Figure 2:
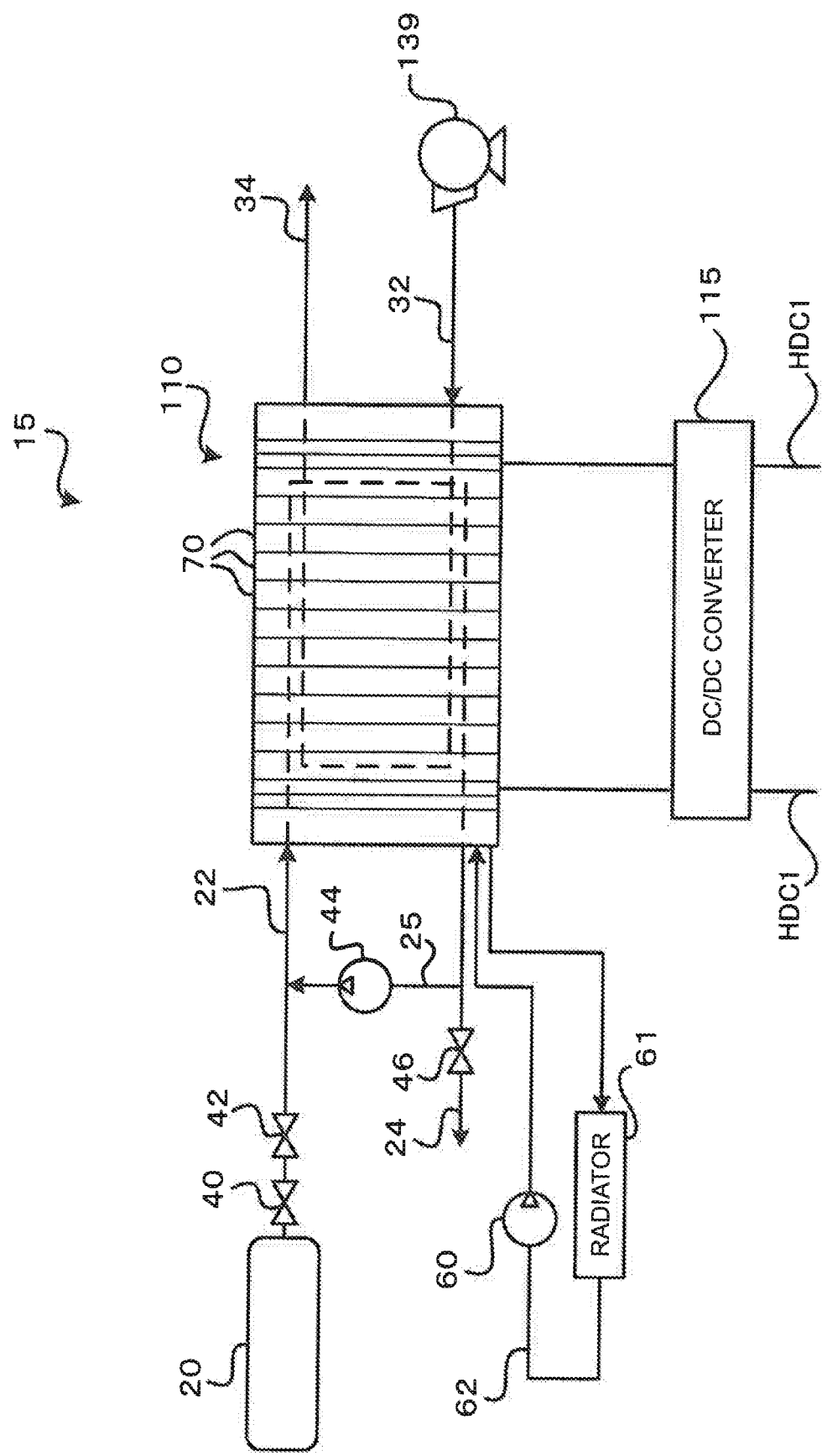
FIG. 2 is an explanatory view showing the general configuration of a fuel cell system.

FIG. 2 shows the general configuration of the fuel cell system 15 installed on the fuel cell vehicle 10. The fuel cell system 15 further includes a hydrogen tank 20 and a radiator 61, in addition to the above-mentioned fuel cell 110, air compressor (ACP) 139, water pump (WP) 60, and the hydrogen pump (H$_2$P) 44.

The fuel cell 110 has a stack structure in which a plurality of unit cells 70 as power generating bodies is laminated. In this embodiment, the fuel cell 110 is a polymer electrolyte fuel cell, hut other types of fuel cells may be used. The output voltage of the fuel cell 110 is changed depending on the performance of each unit cell 70, the number of the unit cells 70 laminated, and operating conditions (such as a temperature and a humidity) of the fuel cell 110. In this embodiment, the output voltage of the fuel cell 110 obtained when the fuel cell 110 generates electric power at an operating point having the highest power generation efficiency is about 240 V.

Each of the unit cells 70 includes an electrolyte membrane, and an anode and a cathode as electrodes formed on respective surfaces of the electrolyte membrane. In each unit cell 70, an inside-cell fuel gas passage as a passage of fuel gas containing hydrogen is formed on the anode, and an inside-cell oxidation gas passage as a passage of oxidation gas containing oxygen is formed on the cathode. Also, an inter-cell coolant passage of cooling water as a coolant is formed between adjacent ones of the unit cells 70. The fuel cell 110 is also formed with a plurality of passages extending through the interior of the fuel cell 110 in the direction of lamination of the unit cells 70. Namely, an oxidation gas supply manifold that distributes oxidation gas to the oxidation gas passages in the respective cells, and an oxidation gas discharge manifold into which the oxidation gas is collected from the oxidation gas passages in the respective cells are formed. Also, a fuel gas supply manifold that distributes fuel gas to the fuel gas passages in the respective cells, and a fuel gas discharge manifold into which the fuel gas is collected from the fuel gas channels in the respective cells are formed. Also, a coolant supply manifold that distributes the coolant to the coolant passages between respective pairs of adjacent cells, and a coolant discharge manifold into which the coolant is collected from the coolant passages between the respective adjacent cells are formed.

The hydrogen tank 20 is a storage device in which hydrogen gas as fuel gas is stored, and is connected to a hydrogen supply manifold of the fuel cell 110 via a hydrogen supply passage 22. On the hydrogen supply passage 22, a regulator 40 as a pressure reduction valve, and an injector 42 that adjusts the amount of hydrogen supplied from the hydrogen tank 20 through opening and closing operation of an electromagnetic valve, are provided in this order as viewed from the hydrogen tank 20.

A hydrogen discharge passage 24 is connected to a hydrogen discharge manifold of the fuel cell 110. The hydrogen discharge passage 24 is provided with a purge valve 46. A connecting passage 25 is provided for connecting the hydrogen supply passage 22 with the hydrogen discharge passage 24. The connecting passage 25 is connected to the hydrogen supply passage 22 at a point downstream of the injector 42, and is connected to the hydrogen discharge passage 24 at a point upstream of the purge valve 46. Hydrogen supplied from the hydrogen tank 20 via the hydrogen supply passage 22 is used for power generation in the fuel cell 110, and then discharged into the hydrogen discharge passage 24. The hydrogen discharged into the hydrogen discharge passage 24 is guided again to the hydrogen supply passage 22, via the connecting passage 25. Thus, in the fuel cell system 15, hydrogen circulates through a part of the hydrogen discharge passage 24, connecting passage 25, a part of the hydrogen supply passage 22, and passages of fuel gas formed in the fuel cell 110. In the connecting passage 25, the above-mentioned hydrogen pump (H$_2$P) 44 is provided for generating driving force for circulating hydrogen in the passages so as to control the amount of flow of hydrogen. While the purge valve 46 is normally closed during power generation of the fuel cell 110, the purge valve 46 is opened as needed when impurities (such as nitrogen and water vapor) increase in the circulating hydrogen, so that a part of hydrogen gas of which the impurity concentration has increased is discharged to the outside of the system.

The air compressor (ACP) 139 is a device for taking in air from the outside and compressing the air, so as to supply the air as oxidation gas to the fuel cell 110. The air compressor (ACP) 139 is connected to the oxidation gas supply manifold of the fuel cell 110, via an air supply passage 32. The oxidation gas that has been used for power generation in the fuel cell 110 is discharged to the outside of the fuel cell 110, via an air discharge passage 34 connected to the oxidation gas discharge manifold.

The radiator 61 is provided in the coolant passage 62, for cooling the coolant flowing in the coolant passage 62. The coolant passage 62 is connected to the above-mentioned coolant supply manifold and coolant discharge manifold of the fuel cell 110. Also, the above-mentioned water pump (WP) 60 is provided in the coolant passage 62, and the water pump (WP) 60 circulates the coolant in the coolant passage 62, so that the interior temperature of the fuel cell 110 can be adjusted.

Referring back to FIG. 1, the fuel cell 110 is connected to a first high-voltage DC conductor HDC1 via the DC/DC converter (FDC) 115. The DC/DC converter (FDC) 115 boosts the output voltage of the fuel cell 110 to a high voltage that can be used in inverters 132, 137 which will be described later.

In this embodiment, the high-voltage battery 140 included in the fuel cell vehicle 10 functions as an auxiliary power supply of the fuel cell 110. For example, the high-voltage battery 140 may be provided by a lithium-ion battery, or a nickel hydride battery, capable of charge and discharge. The high-voltage battery 140 stores electric power generated by the fuel cell 110, and electric power regenerated when the vehicle is decelerated. The output voltage of the high-voltage battery 140 of this embodiment, when it is in a steady state that does not particularly require charging, is about 288 V.

The high-voltage battery 140 is connected to the DC/DC converter (BDC) 134 via a second high-voltage DC conductor HDC2, and the DC/DC converter (BDC) 134 is connected to the first high-voltage DC conductor HDC1. The DC/DC converter (BDC) 134 variably adjusts the voltage level of the first high-voltage DC conductor HDC1, and switches the charge/discharge state of the high-voltage battery 140. When the high-voltage battery 140 is in the discharge state, the DC/DC converter (BDC) 134 boosts the output voltage of the high-voltage battery 140 to a high voltage that can be used in the inverters 132, 137 which will be described later. When the high-voltage battery 140 is in the charge state, the DC/DC converter (BDC) 134 steps down the voltage across the first high-voltage DC conductor HDC1 to a voltage with which the high-voltage battery 140 can be charged. In this manner, the high-voltage battery 140 is charged with electric power delivered from the fuel cell 110, or regenerative power of the drive motor 136.

The inverters 132, 137 are connected to the first high-voltage DC conductor HDC1. In this embodiment, the operating voltage of the inverters 132, 137 is about 650 V. The inverter 132 is connected to the drive motor 136 that drives the wheels via gears, etc., and functions as a driver of the drive motor 136. The drive motor 136 is provided by a synchronous motor including three-phase coils. The inverter 132, which is provided by a three-phase inverter circuit, converts the output power of the fuel cell 110 supplied via the DC/DC converter (FDC) 115, and the output power of the high-voltage battery 140 supplied via the DC/DC converter (BDC) 134, into three-phase AC power, and supplies the AC power to the drive motor 136. The drive motor 136 drives the wheels WL with torque corresponding to the electric power supplied thereto. The inverter 132 is also able to deliver regenerative power (regenerative energy) produced through regenerative braking of the drive motor 136, to the first high-voltage DC conductor HDC1.

The inverter 137 is connected to an ACP motor 138 for driving the air compressor (ACP) 139, and functions as a driver of the air compressor (ACP) 139. Like the drive motor 136, the ACP motor 138 is provided by a synchronous motor including three-phase coils. Like the inverter 132, the inverter 137 is provided by a three-phase inverter circuit, and converts the output power of the fuel cell 110 supplied via the DC/DC converter (FDC) 115, and the output power of the high-voltage battery 140 supplied via the DC/DC converter (BDC) 134, into three-phase AC power, so as to supply the AC power to the ACP motor 138. The ACP motor 138 drives the air compressor (ACP) 139 with torque corresponding to the electric power supplied thereto, so that the air is supplied to the fuel cell 110.

In the fuel cell vehicle 10, inverters 141, 143 are connected to the second high-voltage DC conductor HDC2. The inverter 141 is connected to a WP motor 142 for driving the water pump (WP) 60, and functions as a driver of the water pump (WP) 60. Like the drive Motor 136, the WP motor 142 is provided by a synchronous motor including three-phase coils. Like the inverter 132, the inverter 141 is provided by a three-phase inverter circuit, and converts electric power supplied via the second high-voltage DC conductor HDC2 into three-phase AC power, so as to supply the AC power to the WP motor 142. The WP motor 142 drives the water pump (WP) 60 with torque corresponding to the electric power thus supplied, so that the fuel cell 110 is cooled.

The inverter 143 is connected to an $H_2P$ motor 144 for driving the hydrogen pump ($H_2P$) 44, and functions as a driver of the hydrogen pump ($H_2P$) 44. Like the drive motor 136, the $H_2P$ motor 144 is provided by a synchronous motor including three-phase coils. Like the inverter 132, the inverter 143 is provided by a three-phase inverter circuit, and converts electric power supplied via the second high-voltage DC conductor HDC2 into three-phase AC power, so as to supply the AC power to the $H_2P$ motor 144. The $H_2P$ motor 144 drives the hydrogen pump ($H_2P$) 44 with torque corresponding to the electric power thus supplied, so that hydrogen circulates through the passages of hydrogen gas in the fuel cell system 15.

Further, a DC/DC converter 145 is connected to the second high-voltage DC conductor HDC2. The DC/DC converter 145 is connected to a low-voltage battery 146, via a low-voltage DC conductor LDC. The low-voltage battery 146 is a secondary battery having a lower voltage (12V in this embodiment) than the high-voltage battery 140. When the low-voltage battery 146 is charged, the DC/DC converter 145 steps down the voltage across the second high-voltage DC conductor HDC2, to a voltage with which the low-voltage battery 146 can be charged.

Low-voltage accessories 147 are connected to the low-voltage DC conductor LDC, and electric power is supplied from the low-voltage battery 146 to the low-voltage accessories 147. For example, the low-voltage accessories 147 include lights, such as head lights and stop lamps, turn signals, wipers, meters, etc. on an instrument panel, and a navigation system, and also include drive units for opening and closing various valves provided in pipes of fuel gas, oxidation gas, and coolant, as shown in FIG. 2. It is, however, to be noted that the low-voltage accessories 147 are not limited to these devices.

The fuel cell vehicle 10 further includes a controller (not shown). The controller has CPU, ROM, RAM, and an input/output port. The controller performs control of the fuel cell system 15, control of the whole power supply system including the fuel cell system 15 and the high-voltage battery 140, and control of each part of the fuel cell vehicle 10. The controller obtains output signals from sensors provided in respective parts of the fuel cell vehicle 10, and also obtains information, such as the accelerator operation amount and the vehicle speed, concerning operation of the vehicle. Then, the controller outputs drive signals to respective parts associated with power generation and traveling of the fuel cell vehicle 10. More specifically, the controller outputs drive signals to the DC/DC converters 115, 134, 145, inverters 132, 137, 141, 143, and the low-voltage accessories 147, for example. The controller that fulfills the above functions need not be configured as a single controller. For example, the controller may consist of two or more controllers, such as a controller associated with operation of the fuel cell system 15, a controller associated with traveling of the fuel cell vehicle 10, and a controller that performs control of vehicle accessories that are not associated with traveling, and necessary information may be transmitted between the two or more controllers.

A-2 Arrangement of High-Voltage Units and Operation at the Time of Collision

Figure 3:
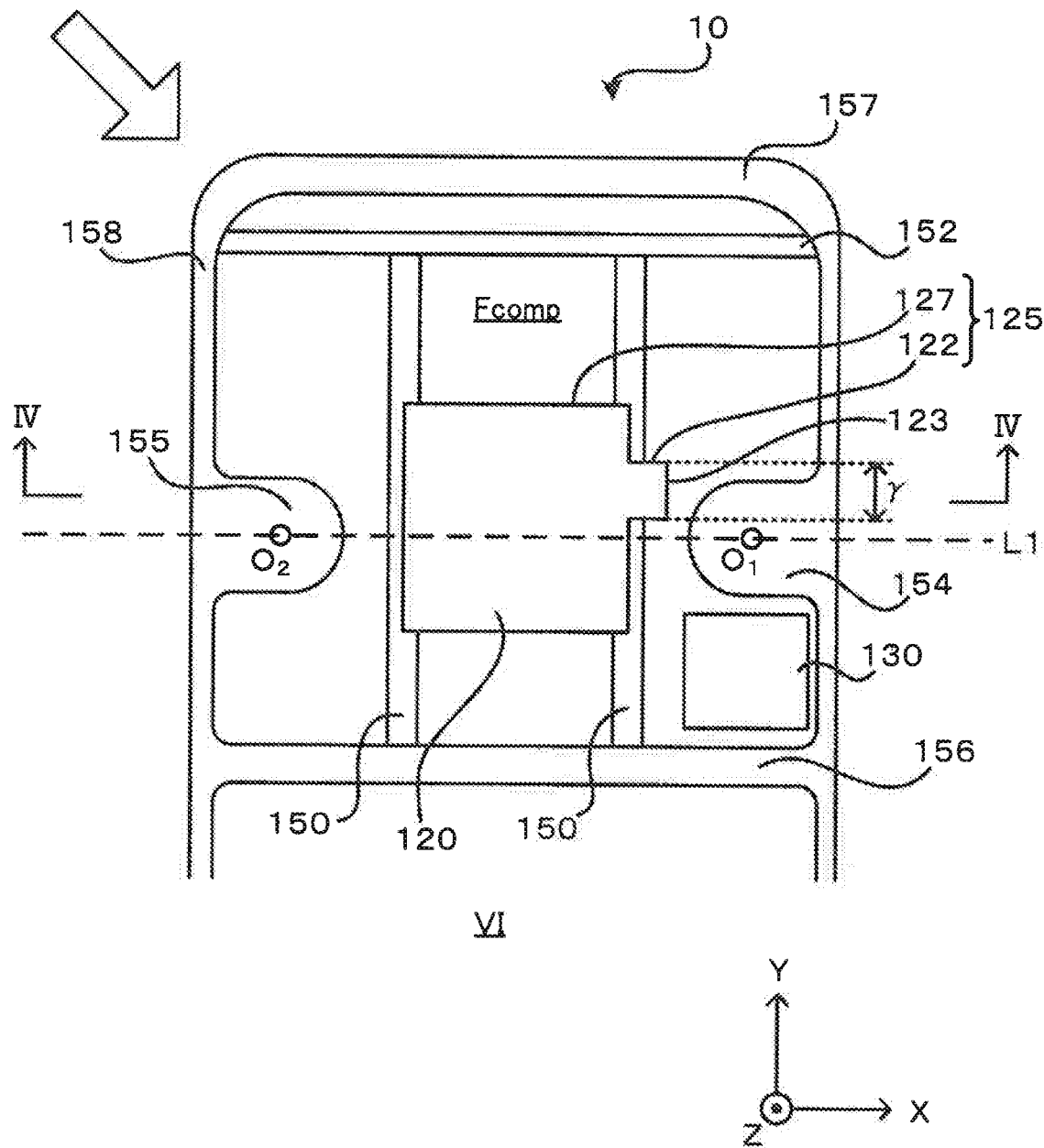
FIG. 3 is a plan view schematically showing a condition in a front compartment.

FIG. 3 schematically shows a condition within a front compartment (Fcomp) of the fuel cell vehicle 10. The front compartment is space provided in front of a vehicle cabin VI. While various devices are placed in the front compartment, those other than a first high-voltage unit 120 and a second high-voltage unit 130, and a part of the structure associated with a body 158 of the fuel cell vehicle 10 are not illustrated in FIG. 3. In FIG. 3, the X-, Y-, and Z-axes that are at right angles to one another are indicated. The +X direction is the right-hand side of the fuel cell vehicle 10, and the −X direction is the left-hand side of the fuel cell vehicle 10. The X direction is "the width direction of the vehicle" and "the lateral direction". The +Y direction indicates the front side of the fuel cell vehicle 10 in the traveling direction, and the −Y direction indicates the rear side of the fuel cell vehicle 10 in the traveling direction. Namely, the Y direction is "the longitudinal direction of the vehicle". The +Z direction is the upper side of the fuel cell vehicle 10, and the −Z direction is the lower side of the fuel cell vehicle 10. The Z direction is "the vertical direction". These directions denote the same directions in FIG. 4 through FIG. 15 that will be described later.

The first high-voltage unit 120 includes first high-voltage devices, and a first case 125 that houses the first high-voltage devices. The second high-voltage unit 130 includes second high-voltage devices, and a second case that houses the second high-voltage devices. The first high-voltage devices and the second high-voltage devices are arbitrary devices that have electric circuits, and are required to be less likely or unlikely to be exposed to the outside from the case when the case is damaged at the time of collision of the vehicle, from the standpoint of the safety, for example. The requirement may be specified according to various rules, such as laws. The first high-voltage devices and second high-voltage devices may be devices of which the operating voltage is equal to or higher than DC 60V or AC 30V, for example. Also, the operating voltage of the first high-voltage devices and second high-voltage devices may be equal to or higher than DC 100V. Also, the operating voltage of the first high-voltage devices and second high-voltage devices may be equal to or lower than DC 300V. In this embodiment, the first case 125 and the second case are formed of aluminum or aluminum alloy, thus assuring sufficient strength of the first and second cases and reduction in their weights. It is, however, to be noted that the first case 125 and the second case may be formed of other types of metal, such as stainless steel.

In this embodiment, the first high-voltage unit 120 includes the DC/DC converter (FDC) 115 and the inverters 141, 143, as the first high-voltage devices (see FIG. 1). The second high-voltage unit 130 includes the DC/DC converter (BDC) 134 and the inverters 132, 137, as the second high-voltage devices (see FIG. 1). The DC/DC converter (BDC) 134 and the inverters 132, 137 included in the second high-voltage unit 130 will also be called "power control unit (PCU)".

A front bumper 157 is provided as a part of the body 158, at the front side of the front compartment. The front compartment is partitioned at the rear side from the vehicle cabin VI with a dashboard panel 156. In the fuel cell vehicle 10, a cross member 152 that extends in the width direction of the vehicle, and two side frames 150 that extend in the longitudinal direction of the vehicle, are connected to the body 158, and the strength of the vehicle body is increased by the two side frames 150 and the cross member 152. As shown in FIG. 3, parts of the two side frames 150 and the cross member 152 are located so as to pass through the front compartment. Also, a pair of suspension towers 154, 155 that protrudes upward is provided in the front compartment. The suspension towers are formed so as to cover front suspensions that are located below the vehicle body and support the front wheels of the fuel cell vehicle 10, and support upper end portions of the front suspensions.

The first high-voltage unit 120 is located between the suspension towers 154, 155, and between the dashboard panel 156 and the front bumper 157, within the front compartment. The first high-voltage unit 120 is superposed on the fuel cell 110 stored inside a fuel cell case (see FIG. 4 that will be described later). Then, a stacked body of the first high-voltage unit 120 and the fuel cell 110 is supported on the two side frames 150, via rubber bushes (not shown).

A projecting portion 122 that projects in the +X direction is provided on a side face of the first high-voltage unit 120 closer to the suspension tower 154 (on the right-hand side). The projecting portion 122, when viewed from the top, is located in front of a straight line connecting center axes $O_1$, $O_2$ of the suspension towers 154, 155 in the traveling direction of the vehicle. In FIG. 3, the straight line connecting the center axes $O_1$, $O_2$ of the suspension towers 154, 155, when the front compartment is viewed from the top in the vertical direction, is denoted as straight line L1. The positions of the center axes $O_1$, $O_2$ of the suspension towers 154, 155 shown in FIG. 3 correspond to locations where the upper end portions of the front suspensions are supported by the respective suspension towers 154, 155. As shown in FIG. 3, a flat portion 123 as a flat surface formed generally in parallel with the traveling direction (Y-axis direction) and the vertical direction (Z-axis direction) formed, at a distal end portion of the projecting portion 122. In FIG. 3, the length of the flat portion 123 as measured in the Y direction (longitudinal direction) is denoted as length γ. In this embodiment, no other high-voltage devices are placed between the projecting portion 122 and the suspension tower 154.

The second high-voltage unit 130 is placed in space between the right suspension tower 154 of the fuel cell vehicle 10 and the dashboard panel 156. The second high-voltage unit 130 is supported by the suspension tower 154, dashboard panel 156, and the body 158.

Figure 4:
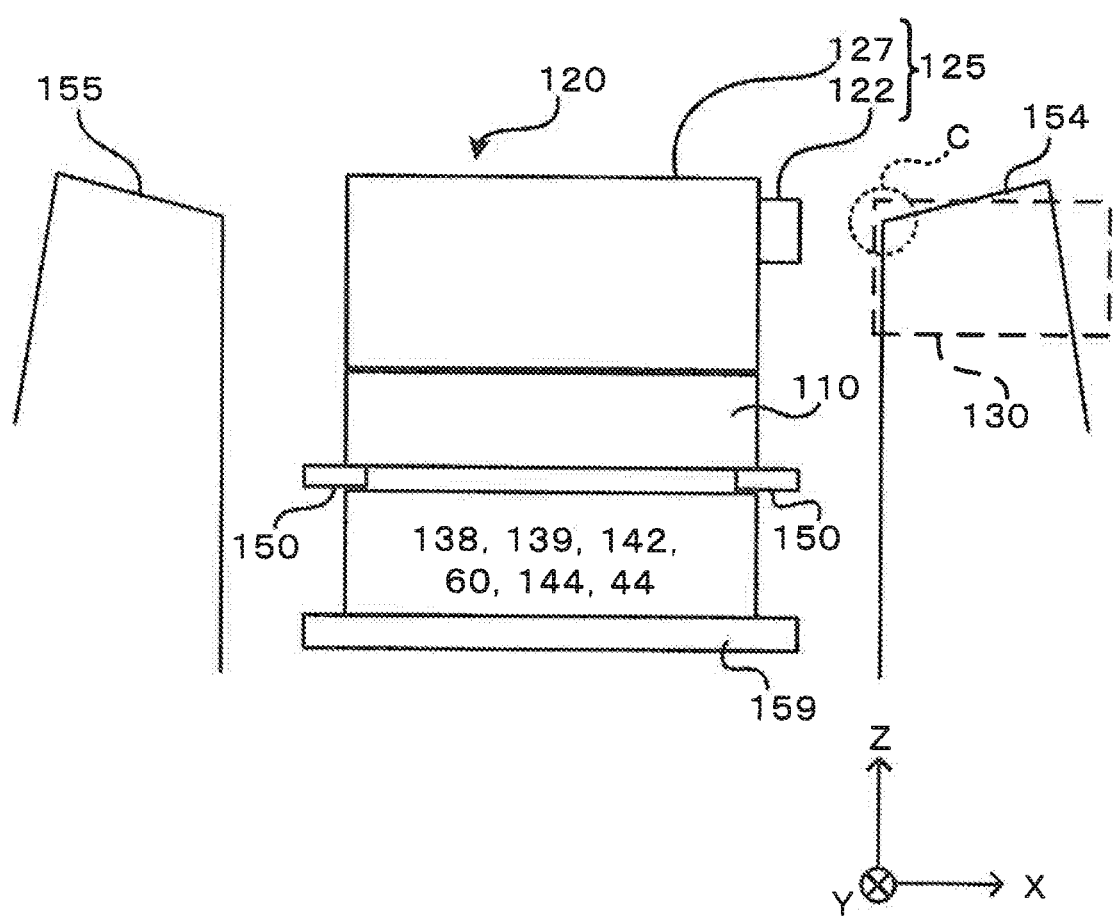
FIG. 4 is an explanatory view schematically showing the arrangement of respective parts in the front compartment.

FIG. 4 schematically shows the arrangement of respective parts in the interior of the front compartment, as viewed in a IV-IV cross section shown in FIG. 3. As described above, the fuel cell 110, and the first high-voltage unit 120 superposed on the fuel cell 110 are supported on the two side frames 150. Below the fuel cell 110, the ACP motor 138, air compressor (ACP) 139, WP motor 142, water pump (WP)

60, H$_2$P motor 144, and the hydrogen pump (H$_2$P) 44, which are fuel cell accessories working during power generation of the fuel cell 110, are placed. The fuel cell accessories are supported on a suspension member 159 connected to the body 158.

In FIG. 4, the position of the second high-voltage unit 130 located behind the IV-IV cross section in the traveling direction, when it is projected on the IV-IV cross section, is indicated by the broken line. As described above, the suspension towers 154, 155 are formed so as to cover the front suspensions, and the front wheels are connected to the lower ends of the front suspensions. Namely, the wheels WL are located below the suspension towers 154, 155. Thus, the space between the suspension tower 154 and the dashboard panel 156 becomes narrower along the shape of the wheel WL as its level is lower. Therefore, the second high-voltage unit 130 of this embodiment placed in the space formed between the suspension tower 154 and the dashboard panel 156 is located at a level that overlaps with an upper end portion of the suspension tower 154 in the horizontal direction. Thus, the second high-voltage unit 130 is located at a position that overlaps with the first high-voltage unit 120 in the horizontal direction.

Also, as shown in FIG. 4, the projecting portion 122 provided on the side face of the first case 125 of the first high-voltage unit 120 is located at a position that overlaps with the suspension tower 154 in the horizontal direction. In this embodiment, the suspension tower 154 formed in the shape of a column has an upper-end corner portion that is closest to the first high-voltage unit 120, and the projecting portion 122 is located at a position that overlaps with the upper-end corner portion in the horizontal direction. In FIG. 4, the upper-end corner portion of the suspension tower 154, which is closest to the first high-voltage unit 120, is indicated as "region C" surrounded by a broken line. Among walls of the suspension tower 154 which form space covering the front suspension located below the vehicle body, the upper-end corner portion has higher rigidity than other portions (e.g., side portions).

Figure 5:
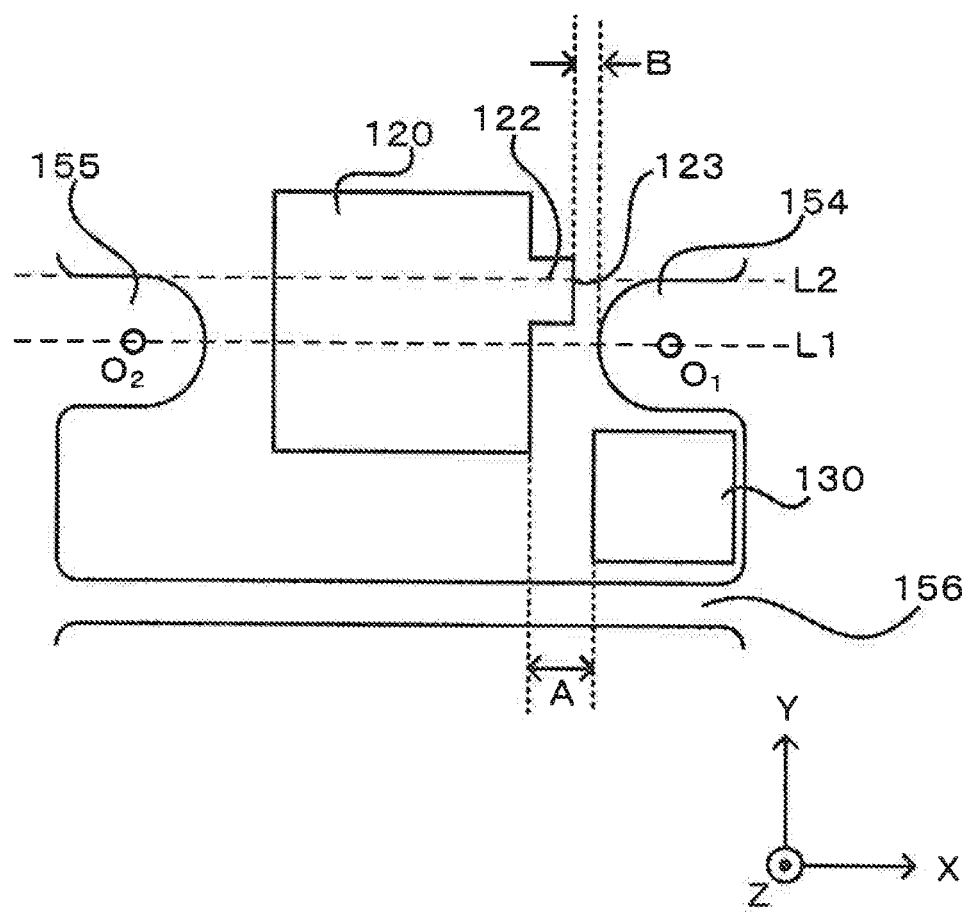
FIG. 5 is an explanatory view showing a condition in the front compartment before collision.
Figure 6:
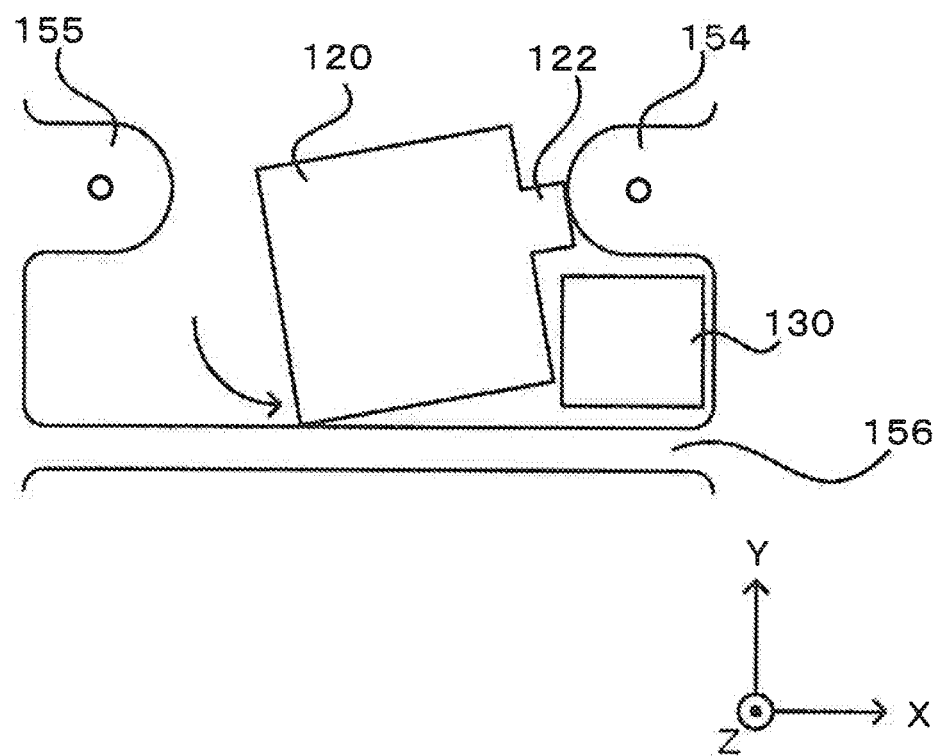
FIG. 6 is an explanatory view showing a condition in the front compartment after collision.

FIG. 5 and FIG. 6 show conditions within the front compartment before and after collision of the fuel cell vehicle 10, as viewed from above in the vertical direction. FIG. 5 shows a condition before the collision, and FIG. 6 shows a condition after the collision. In this embodiment, the second high-voltage unit 130 is located at a position that does not overlap with the first high-voltage unit 120 in the traveling direction (Y direction) of the vehicle. Therefore, even if a collision load is applied from ahead of the fuel cell vehicle 10 in the traveling direction; and the first high-voltage unit 120 moves, the first high-voltage unit 120 is unlikely to damage the second high-voltage unit 130. In this embodiment, the case where a collision load is applied diagonally from the front, left side of the vehicle (in a direction indicated by an outlined arrow in FIG. 3) is focused on, and FIG. 6 shows a condition where a collision load is applied diagonally from the front, left side of the vehicle.

When a collision load is applied diagonally from the front, left side of the vehicle, as indicated by the outlined arrow in FIG. 3, a front, left portion of the fuel cell vehicle 10 is damaged, and a collision load is applied to the first high-voltage unit 120 so that the first high-voltage unit 120 moves diagonally backward right. As a result, in this embodiment, the first high-voltage unit 120 moves diagonally backward right. Since the first high-voltage unit 120 and the fuel cell 110 are fixed to each other in this embodiment, the first high-voltage unit 120 and the fuel cell 110 normally move as a unit when the collision load is applied thereto. When the first high-voltage unit 120 moves diagonally backward right, the projecting portion 122 of the first high-voltage unit 120 collides with the suspension tower 154.

More specifically, in this embodiment, the projecting portion 122 is provided on the first high-voltage unit 120; therefore, if a collision load is applied diagonally from the front, left side of the vehicle, the projecting portion 122 collides with the suspension tower 154, before the first high-voltage unit 120 collides with the second high-voltage unit 130, and movement of the first high-voltage unit 120 is restricted. Thus, when the projecting portion 122 collides with the suspension tower 154, the first high-voltage unit 120 rotates counterclockwise about a point of support at which the projecting portion 122 contacts with the suspension tower 154 as an arrow in FIG. 6. Then, a rear end portion of the first high-voltage unit 120 in the traveling direction, on the side (left-hand side) closer to the suspension tower 155, comes into collision with the dashboard panel 156, so that the first high-voltage unit 120 is stopped.

According to the fuel cell vehicle 10 of this embodiment constructed as described above, the first high-voltage unit 120 located between the suspension towers 154, 155 in the front compartment includes the projecting portion 122 that projects toward one of the suspension towers 154. Therefore, even when a collision load, which may cause a situation where the first high-voltage unit 120 attacks the second high-voltage unit 130, is applied diagonally from the front, left side, the first high-voltage unit 120 is less likely or unlikely to collide with the second high-voltage unit 130, and the force of impact can be alleviated or reduced even when the collision occurs. As a result, damage of the second high-voltage unit 130 due to the collision can be curbed. More specifically, even if the first high-voltage unit 120 moves in response to a collision load at the time of collision of the vehicle, the projecting portion 122 collides with the suspension tower 154 as shown in FIG. 6, so that further movement of the first high-voltage unit 120 is restricted, and the first high-voltage unit 120 is less likely or unlikely to collide with the second high-voltage unit 130.

Thus, damage of the second high-voltage unit 130 due to an attack from the first high-voltage unit 120 is curbed or prevented. Therefore, in the fuel cell vehicle 10 of this embodiment, the first case 125 that constitutes the first high-voltage unit 120 is only required to secure strength sufficient to withstand an assumed collision load. Namely, it is only required to ensure sufficient thickness of the first case 125, or form the first case 125 of a material having a higher rigidity, so that the first case 125 is less likely or unlikely to be damaged even if the assumed collision load is applied thereto. Generally, if the rigidity of the first case 125 of the first high-voltage unit 120 is increased, the weight of the first high-voltage unit 120 increases, and the force of impact applied to the second high-voltage unit 130 when the first high-voltage unit 120 collides with the second high-voltage unit 130 increases. However, in this embodiment, the first high-voltage unit 120 is less likely or unlikely to collide with the second high-voltage unit 130; therefore, there is no need to secure the strength of the second high-voltage unit 130 in view of attack from the first high-voltage unit 120. Therefore, the rigidity of the second case included in the second high-voltage unit 130 may be set to a low value, and increase in the weight of the second high-voltage unit 130 can be suppressed. The reduction in the weight of the second high-voltage unit 130 is also desirable in terms of improvement of the fuel economy of the fuel cell vehicle 10.

In order to reduce the possibility of collision of the first high-voltage unit 120 with the second high-voltage unit 130 at the time of collision of the vehicle, it is desirable to set the distance between the projecting portion 122 and the suspension tower 154, to be shorter than the distance between the first high-voltage unit 120 on the rear side of the projecting portion 122, and the second high-voltage unit 130, as shown in FIG. 5. In FIG. 5, the distance (as measured in the X-axis direction) between the projecting portion 122 and the suspension tower 154 is denoted as "distance B". In FIG. 5, the distance (as measured in the X-axis direction) between a portion of the first high-voltage unit 120 on the rear side of the projecting portion 122 and the second high-voltage unit 130 is denoted as "distance A". In this embodiment, the relationship of A>B is established. Therefore, it is easy to cause the projecting portion 122 to collide with the suspension tower 154, before the first high-voltage unit 120 collides with the second high-voltage unit 130.

It is desirable that the first high-voltage unit 120 is positioned such that the whole of the projecting portion 122 is located on the front side in the traveling direction, relative to the straight line L1 connecting the center axes $O_1$, $O_2$ of the suspension towers 154, 155, as shown in FIG. 3 and FIG. 5. With this arrangement, when a collision load is applied diagonally from the front, left side of the vehicle, the projecting portion 122 is likely to collide with the suspension tower 154, before the first high-voltage unit 120 collides with the second high-voltage unit 130. However, the projecting portion 122 need not be entirely located on the front side in the traveling direction relative to the above-indicated straight line L1, but at least a part of the projecting portion 122 may be located on the front side of the straight line L1 in the traveling direction. For example, while the length of the projecting portion 122 in the longitudinal direction is denoted as length γ (see FIG. 3), the proportion of its part located on the front side of the straight line L1 in the traveling direction is desirably 20% or more of the length γ, more desirably 50% or more, and further desirably 80% or more.

It is also desirable that the first high-voltage unit 120 is positioned such that at least a part of the projecting portion 122 is located on the front side in the traveling direction, relative to a straight line L2 connecting front end portions in the traveling direction of the suspension towers 154, 155, when viewed from the top, as shown in FIG. 5. With this arrangement, when a collision load is applied diagonally from the front, left side of the vehicle, the projecting portion 122 is more likely to collide with the suspension tower 154, before the first high-voltage unit 120 collides with the second high-voltage unit 130. When at least a part of the projecting portion 122 is located on the rear side of the straight line L2 in the traveling direction, in the top view shown in FIG. 5, movement of the first high-voltage unit 120 can be desirably stopped by the suspension tower 154, when a collision load is applied in the X-axis direction, more specifically, from the left side.

In this embodiment, the projecting portion 122 is formed with the flat portion 123 as a flat surface formed generally in parallel with the Y-axis direction and the Z-axis direction. Therefore, it is possible for the projecting portion 122 to secure a wider area of surface that can contact (collide) with the suspension tower 154 at the time of collision of the vehicle. Accordingly, even when moving conditions (such as a moving direction) of the first high-voltage unit 120 at the time of collision of the vehicle vary, the effect of stopping movement of the first high-voltage unit 120 by means of the suspension tower 154 can be assured. As factors of variation in the moving conditions of the first high-voltage unit 120 at the time of collision of the vehicle, variation in the angle of a collision load applied diagonally from the front, left side of the vehicle, and variation in the deformed state of the body 158 when a collision load is applied thereto, may be considered. It is, however, to be noted that, even if the projecting portion 122 does not have the flat portion 123 formed generally in parallel with the Y-axis direction and the Z-axis direction, a similar effect of stopping the first high-voltage unit 120 can be obtained by causing the projecting portion 122 to collide with the suspension tower 154.

Further, in this embodiment, the projecting portion 122 is provided at a position that overlaps in the horizontal direction with the region C (see FIG. 4) closest to the first high-voltage unit 120 in the upper-end corner portion of the suspension tower 154. With this arrangement, at the time of collision of the vehicle, the projecting portion 122 is likely to collide with the region of the suspension tower 154 having the highest rigidity. Accordingly, movement of the first high-voltage unit 120 can be stopped with further enhanced reliability, by causing the projecting portion 122 to collide with the suspension tower 154.

At least a part of the projecting portion 122 may not overlap with the suspension tower 154 in the horizontal direction. For example, when a collision load applied at the time of collision of the vehicle has a component in the vertical direction, it may be possible to cause the projecting portion 122 to collide with the suspension tower 154, and stop the first high-voltage unit 120, even in the case where at least a part of the projecting portion 122 does not overlap with the suspension tower 154 in the horizontal direction, in a condition before the collision. However, it is desirable that at least a part of the projecting portion 122 overlaps with the suspension tower 154 in the horizontal direction, in a condition before collision, so as to further enhance the reliability in operation to cause the projecting portion 122 to collide with the suspension tower 154, and stop movement of the first high-voltage unit 120.

In this embodiment, the projecting portion 122 projects toward the suspension tower 154, from a side face of a body portion 127 of the first case 125. However, a different arrangement may be employed. For example, a projecting portion may be provided such that it projects toward the suspension tower 154 (in the +X direction), from the top face of the body portion 127 of the first case 125. In this case, too, substantially the same effect of curbing damage of the second high-voltage unit 130 by causing the projecting portion 122 to collide with the suspension tower 154 at the time of collision of the vehicle can be obtained, if the positional relationship between the projecting portion 122 and the suspension tower 154 as described above is satisfied.

In this embodiment, the first high-voltage unit 120 and the second high-voltage unit 130 are located so as to overlap with each other in the horizontal direction. However, a different arrangement may be employed. Even in the case where the first high-voltage unit 120 and the second high-voltage unit 130 do not overlap with each other in the horizontal direction, in a condition before collision of the vehicle, the first high-voltage unit 120 may collide with the second high-voltage unit, when a collision load has a component in the vertical direction. In this case, damage of the second high-voltage unit 130 due to the collision can be curbed or prevented by providing the projecting portion 122 on the first case 125 of the first high-voltage unit 120, as in this embodiment. However, it is generally considered that the component in the vertical direction is not so large, in a collision load at the time of collision of the traveling vehicle.

Therefore, when the first high-voltage unit 120 and the second high-voltage unit 130 are located at positions that overlap with each other in the horizontal direction, the above-described effect can be particularly notably obtained by providing the projecting portion 122 on the first high-voltage unit 120.

In the first case 125 of the first high-voltage unit 120, the projecting portion 122 may be formed by casting, or the like, as a unit with the body portion 127 that forms space in which the first high-voltage devices are housed, or the projecting portion 122 and the body portion 127 may be formed as separate members, and then joined to each other to be integrated. In the case where the body portion 127 and the projecting portion 122 are formed as separate members, it is desirable to form the projecting portion 122 and the body portion 127 of the same material, such as aluminum or aluminum alloy. Thus, it is possible to assure sufficient strength of the projecting portion 122, while suppressing increase in the weight of the first high-voltage unit 120, which would be caused by specially providing the projecting portion 122 in which no devices are placed. The projecting portion 122 may be formed of a metal material different from that of the body portion 127. When the projecting portion 122 and the body portion 127 are formed as separate members, a method of joining these portions 122, 127 together may be selected from various methods, such as a method using a bolt and a nut, a method using rivets, welding, and so forth.

In the case where the projecting portion 122 and the body portion 127 are formed as separate members, the positional relationship between the projecting portion 122 and the suspension tower 154 can be easily made appropriate, even when the relative positional relationship between the first high-voltage unit 120 and the suspension tower 154 is changed, such as when the first high-voltage unit 120 is applied to different vehicle types. Namely, even when the positional relationship between the first high-voltage unit 120 and the suspension tower 154 varies or differs for each vehicle type, the position of the projecting portion 122 relative to the suspension tower 154 can be made appropriate, merely by changing the attaching position of the projecting portion 122. Therefore, the productivity of the fuel cell vehicle(s) can be improved.

B. SECOND EMBODIMENT

Figure 7:
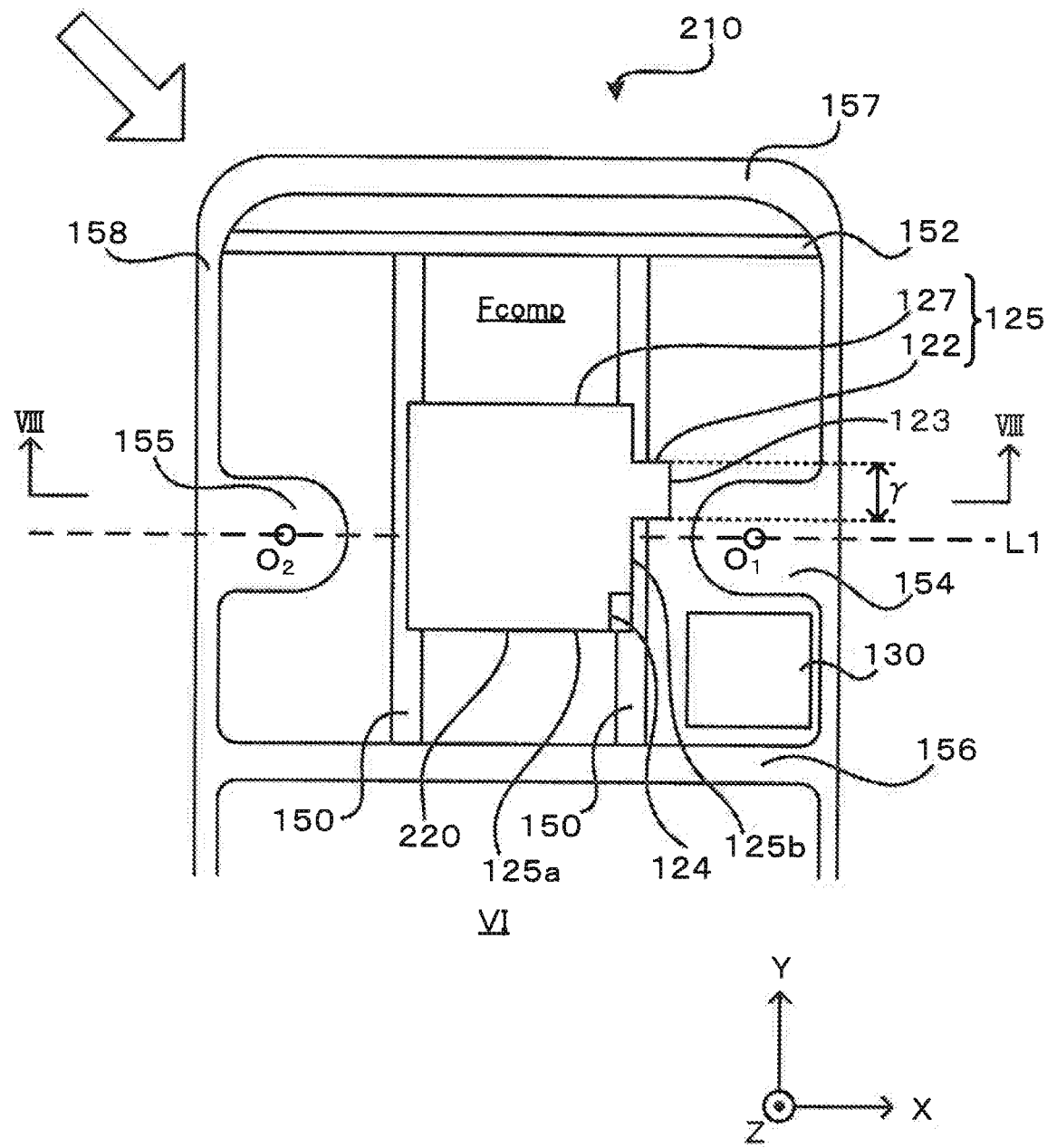
FIG. 7 is a plan view schematically showing a condition in the front compartment.

The plan view of FIG. 7 similar to FIG. 3 schematically shows a condition within a front compartment of a fuel cell vehicle 210 of a second embodiment. The fuel cell vehicle 210 of the second embodiment has substantially the same configuration as the fuel cell vehicle 10 of the first embodiment, except that the vehicle 210 includes a first high-voltage unit 220, in place of the first high-voltage unit 120. Therefore, the same reference numerals are assigned to portions or components common to the first embodiment, and detailed description of the portions or components will not be provided.

The first high-voltage unit 220 of the second embodiment has a chamfered portion 124 formed in a rear end portion of the first high-voltage unit 220 in the traveling direction, on one side (right-hand side) closer to the suspension tower 154. The chamfered portion 124 is located on the inner side of a shape formed by extending side faces of the first case 125 close to the rear end portion. In FIG. 7, the side faces of the first case 125 close to the above-indicated end portion are denoted as side faces 125*a*, 125*b*. In this embodiment, the chamfered portion 124 is formed as a recessed portion where one of corner portions of the first high-voltage unit 220 having the shape of a generally rectangular parallelepiped is recessed. The chamfered portion 124 is provided, along with the projecting portion 122, on the first case 125 that constitutes the first high-voltage unit 220.

Figure 8:
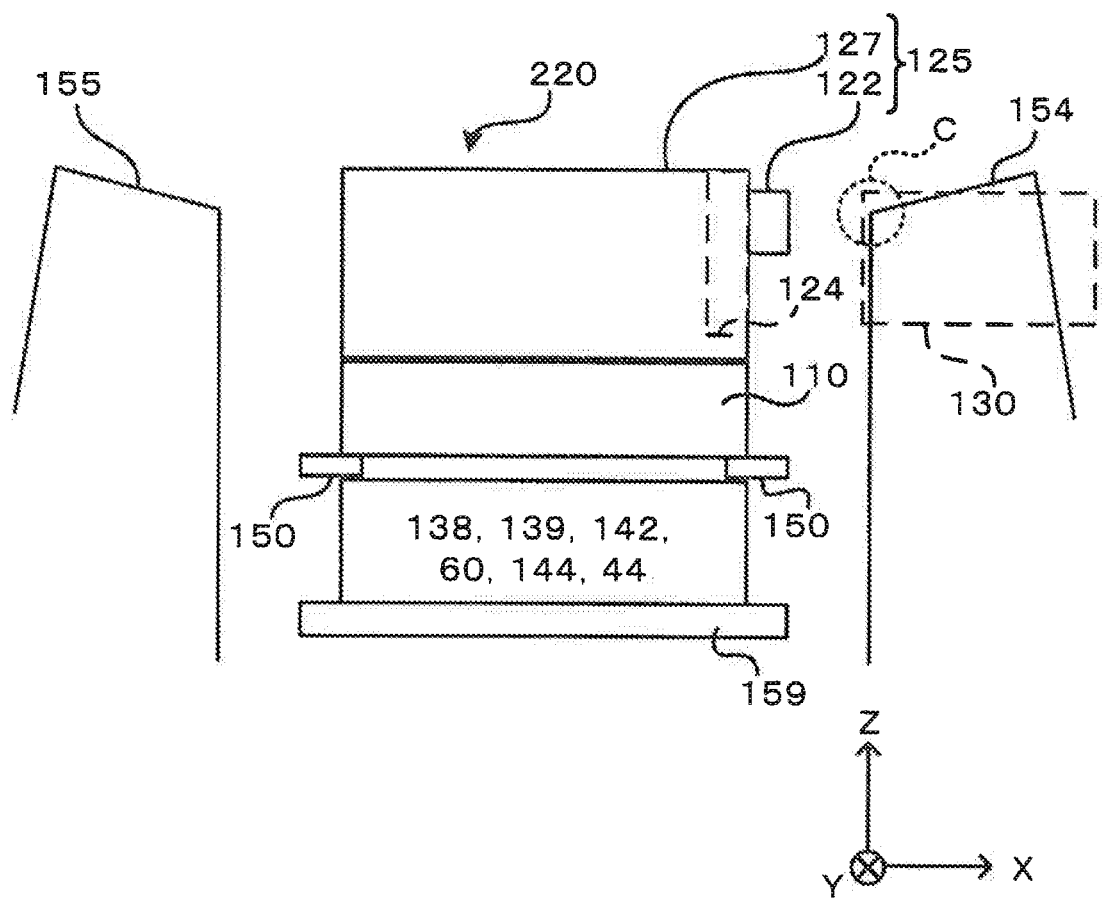
FIG. 8 is an explanatory view schematically showing the arrangement of respective parts in the front compartment.

The explanatory view of FIG. 8 similar to FIG. 4 schematically shows the arrangement of respective parts in the interior of the front compartment, as viewed in an VIII-VIII cross section shown in FIG. 7. In FIG. 8, the position of the chamfered portion 124 located behind the VIII-VIII cross section in the traveling direction, when it is projected on the VIII-VIII cross section, is indicated by a broken line. In this embodiment, as shown in FIG. 8, the chamfered portion 124 as the recessed portion extends in the vertical direction, from the upper end of the first high-voltage unit 220 to the vicinity of the lower end of the first high-voltage unit 220. Therefore, the range over which the chamfered portion 124 is formed overlaps with the second high-voltage unit 130 in the horizontal direction.

Figure 9:
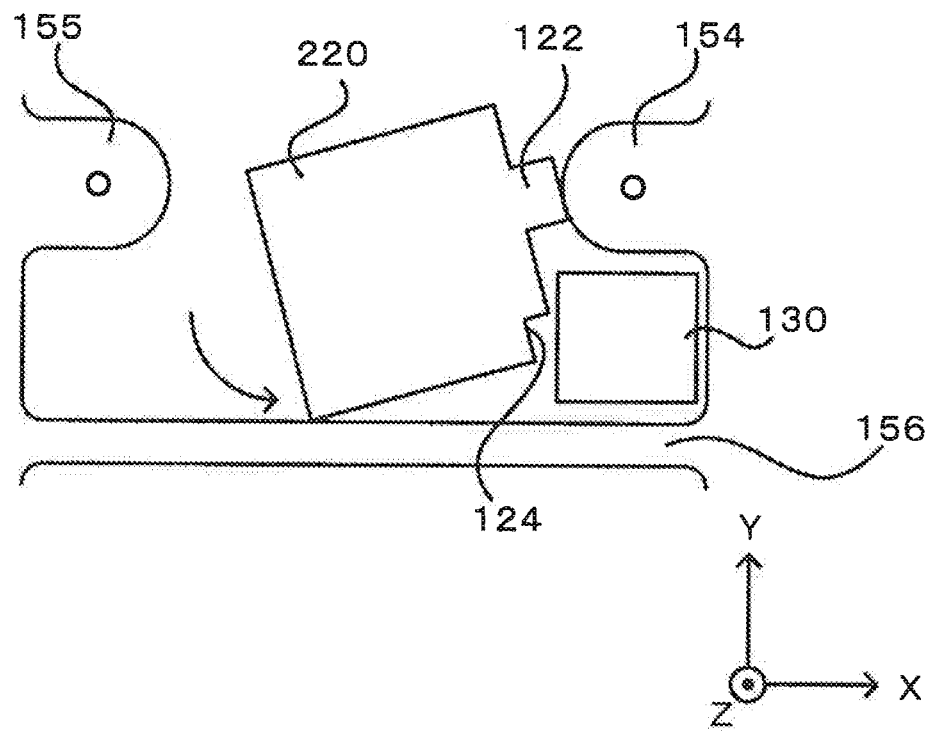
FIG. 9 is an explanatory view showing a condition in the front compartment after collision.

The explanatory view of FIG. 9 similar to FIG. 6 shows a condition within the front compartment after collision of the fuel cell vehicle 210, as viewed from the top in the vertical direction. If a collision load is applied diagonally from the front, left side of the vehicle, as indicated by an outlined arrow in FIG. 7, a front, left portion of the fuel cell vehicle 210 is damaged, and the collision load is applied to the first high-voltage unit 220 so as to move the first high-voltage unit 220 diagonally backward right. As a result, the first high-voltage unit 220 moves diagonally backward right. If the first high-voltage unit 220 moves diagonally backward right, the projecting portion 122 of the first high-voltage unit 220 collides with the suspension tower 154, so that movement of the first high-voltage unit 220 is restricted.

At this time, the first high-voltage unit 220 rotates counterclockwise about a point of support where the projecting portion 122 contacts with the suspension tower 154, as indicated by an arrow in FIG. 9. Then, a rear end portion of the first high-voltage unit 220 in the traveling direction, on the side (left-hand side) closer to the suspension tower 155, comes into collision with the dashboard panel 156, so that the first high-voltage unit 220 is stopped.

As described above, the chamfered portion 124 is formed in the first high-voltage unit 220 of the second embodiment. Therefore, when the high-voltage unit 220 is stopped after the collision, it becomes easier to secure a distance between the first high-voltage unit 220 and the second high-voltage unit 130. Accordingly, the effect of curbing or preventing collision of the first high-voltage unit 220 with the second high-voltage unit 130, and the effect of alleviating the force of impact applied to the second high-voltage unit 130 when the first high-voltage unit 220 collides with the second high-voltage unit 130, can be further enhanced.

In this embodiment, the chamfered portion 124 is formed at a position that overlaps with the second high-voltage unit 130 in the horizontal direction. However, a different arrangement may be employed. For example, when a collision load applied at the time of collision of the vehicle has a component in the vertical direction, the chamfered portion 124 makes it possible to secure a distance between the first high-voltage unit 220 and the second high-voltage unit 130, even in the case where at least a part of the chamfered portion 124 does not overlap with the second high-voltage unit 130 in the horizontal direction, in a condition before collision. It is, however, desirable that at least a part of the chamfered portion 124 overlaps with the second high-voltage unit 130 in the horizontal direction, in a condition before collision, and it is more desirable that the chamfered portion 124 as a whole overlaps with the second high-voltage unit 130 in the horizontal direction, so as to enhance the effect of securing a distance between the first high-voltage unit 220 and the second high-voltage unit 130 at the time of collision of the vehicle.

Figure 10:
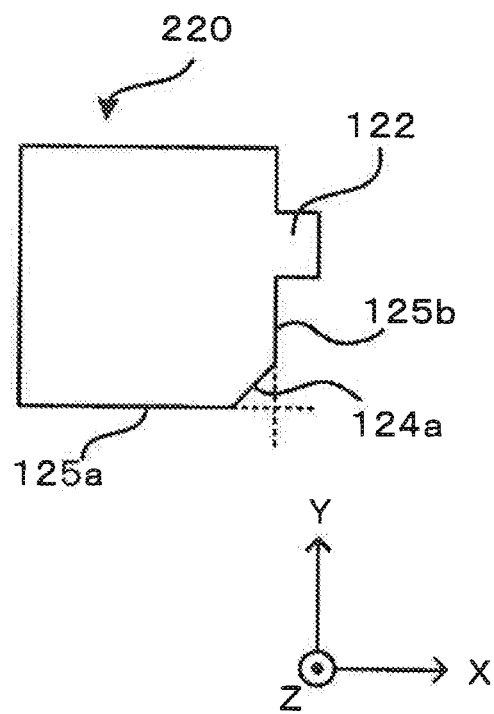
FIG. 10 is an explanatory view showing another example of chamfered portion.
Figure 11:
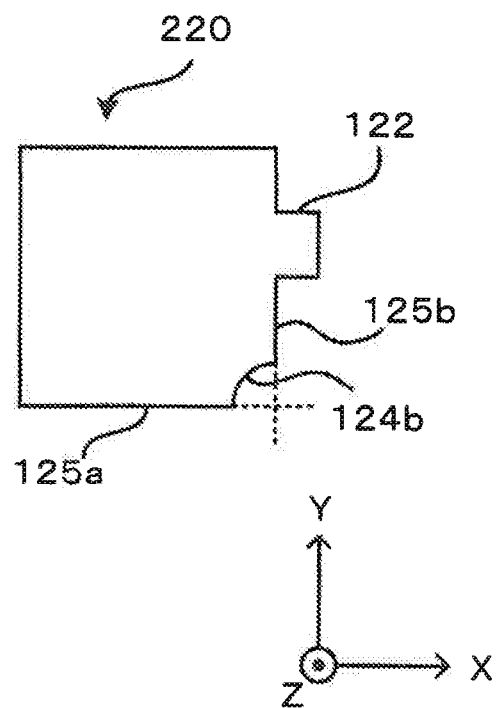
FIG. 11 is an explanatory view showing another example of chamfered portion.
Figure 12:
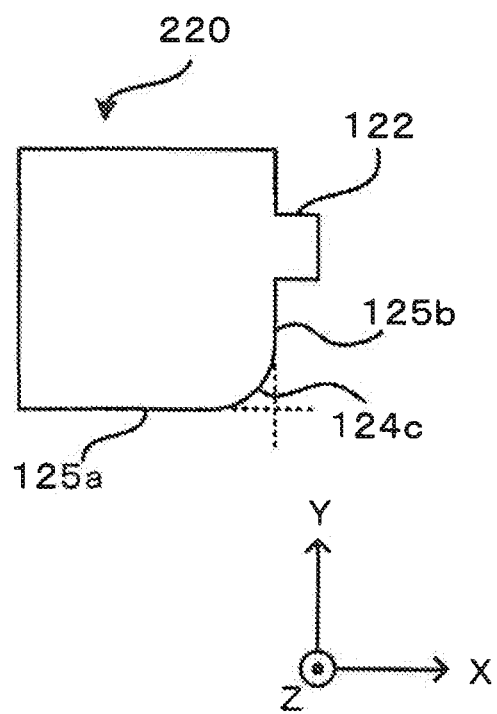
FIG. 12 is an explanatory view showing another example of chamfered portion.

FIG. 10-FIG. 12 show examples of chamfered portions having different shapes from the chamfered portion 124 shown in FIG. 7-FIG. 9. In FIG. 10-FIG. 12, the shape of the chamfered portion when the first high-voltage unit 220 before collision is viewed from the top in the vertical direction is illustrated.

A chamfered portion 124*a* shown in FIG. 10 has a bevel shape formed by cutting off a generally triangular prism having the Z-axis direction as the longitudinal direction, from one corner portion of the first high-voltage unit 220. A chamfered portion 124*b* shown in FIG. 11 is formed as a concave portion where one corner portion of the first high-voltage unit 220 having the shape of a generally rectangular parallelepiped is concaved, like the chamfered portion 124. It is, however, to be noted that the chamfered portion 124 shown in FIG. 7 to FIG. 9 is shaped in a stepped form (i.e., formed by cutting off a quadrangular prism from the corner portion) as viewed from the top, whereas the chamfered portion 124*b* shown in FIG. 11 is shaped to have a curved surface. A chamfered portion 124*c* shown in FIG. 12 has a curved surface, like the chamfered portion 124*b* of FIG. 11, but the chamfered portion 124*c* as a whole is formed in a convex shape. As described above, the surface of the chamfered portion may be a flat surface, a curved surface, in a stepped form, or in a further different form. Also, the chamfered portion as a whole may be in the concave shape, convex shape, bevel shape, or a further different shape, for example.

As described above, the chamfered portion provided in the first case 125 of the first high-voltage unit 220 may have a desired shape provided that it can easily secure a distance between the first high-voltage unit 220 and the second high-voltage unit 130, when the first high-voltage unit 220 moves due to a collision of the vehicle. As described above, the chamfered portion is only required to be formed such that the chamfered portion is located on the inner side of the shape formed by extending the side faces of the first case 125 adjacent to the chamfered portion. Namely, the surface of the chamfered portion is only required to exist, at a position deeper than a hypothetical outer surface of the first case 125, which would be formed by extending the side faces of the first case 125 adjacent to the chamfered portion. While the side faces are denoted as the side faces 125*a,* 125*b* in the top views of FIG. 7 and FIGS. 10-12, the side faces include the top face of the first case 125. When the first case 125 has a rectangular shape, there are three side faces that adjoin the chamfered portion.

C. THIRD EMBODIMENT

Figure 13:
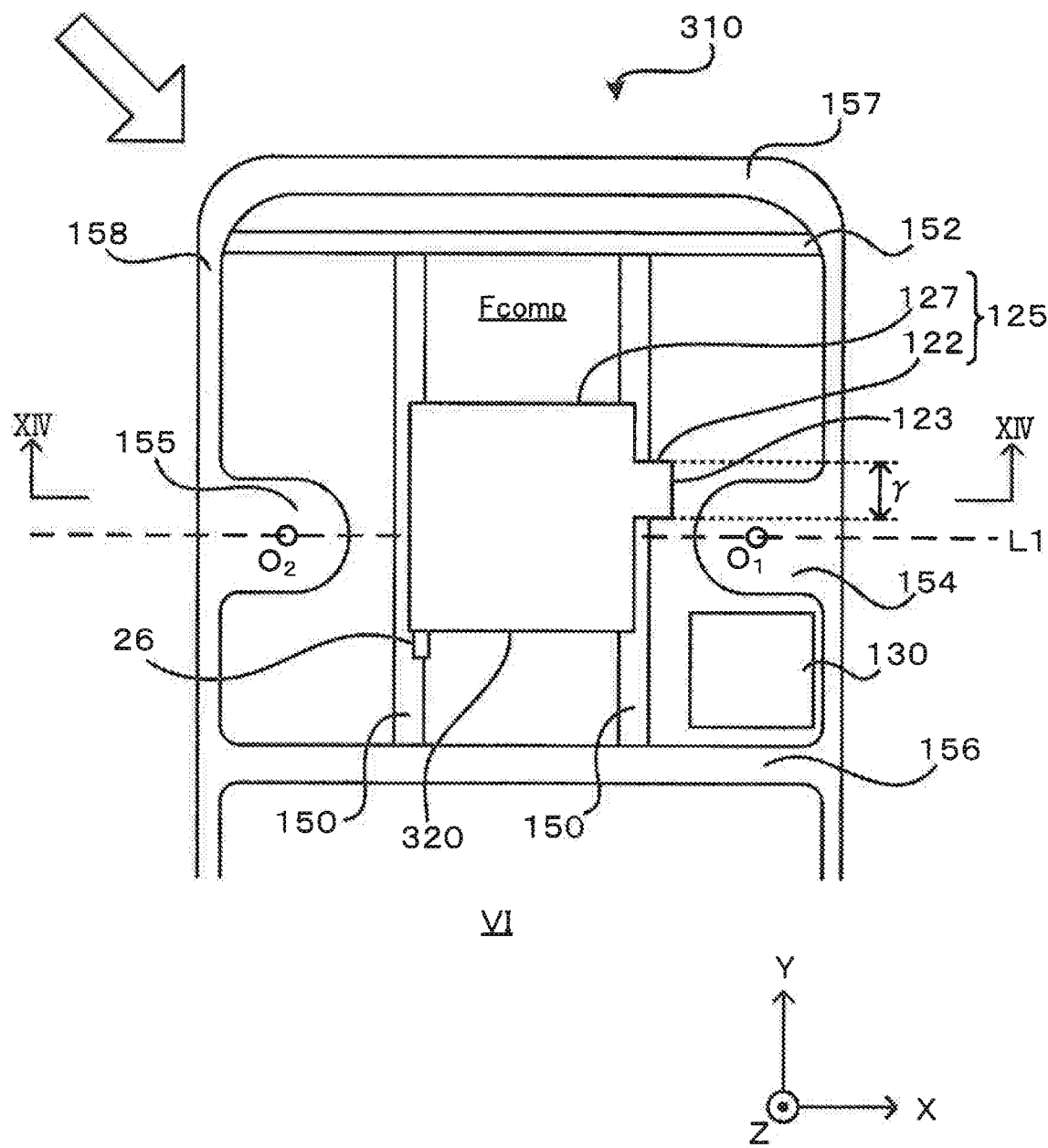
FIG. 13 is a plan view schematically showing a condition in the front compartment.

The plan view of FIG. 13 similar to FIG. 3 schematically shows a condition within a front compartment of a fuel cell vehicle 310 of a third embodiment. The fuel cell vehicle 310 of the third embodiment has substantially the same configuration as the fuel cell vehicle 10 of the first embodiment, except that the vehicle 310 includes a first high-voltage unit 320, in place of the first high-voltage unit 120. Therefore, the same reference numerals are assigned to portions or components common to the first embodiment, and detailed description of the portions or components will not be provided.

The first high-voltage unit 320 of the third embodiment has a protrusion 126 that protrudes in the −Y direction, and the protrusion 126 is formed on a rear end portion of the first high-voltage unit 320 in the traveling direction, on the side (left-hand side) closer to the suspension tower 155. In this embodiment, no other high-voltage devices are placed between the protrusion 126 and the dashboard panel 156. The protrusion 126 is provided on the first case 125 that constitutes the first high-voltage unit 320.

Figure 14:
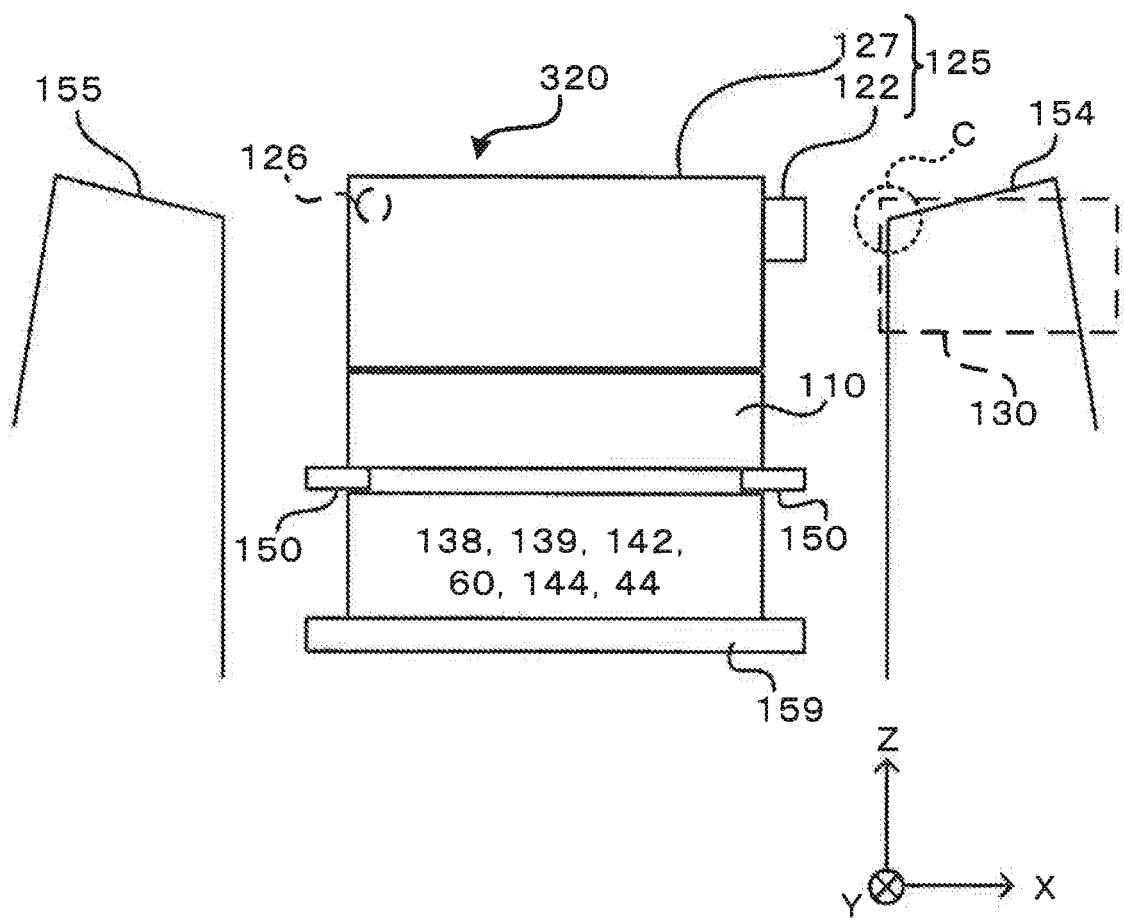
FIG. 14 is an explanatory view schematically showing the arrangement of respective parts in the front compartment.

The explanatory view of FIG. 14 similar to FIG. 4 schematically shows the arrangement of respective parts in the interior of the front compartment, as viewed in a XIV-XIV cross section shown in FIG. 13. In FIG. 14, the position of the protrusion 126 provided on the rear side of the XIV-XIV cross section in the traveling direction is indicated by a broken line. In this embodiment, the protrusion 126 is provided in the vicinity of the left, upper end of the rear end face of the first high-voltage unit 320.

Figure 15:
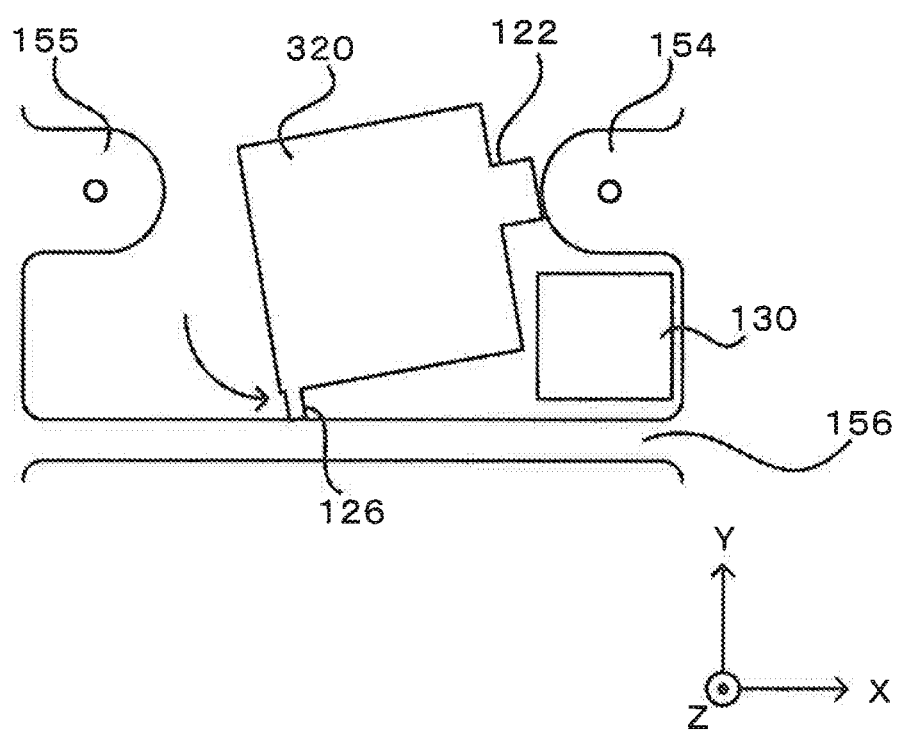
FIG. 15 is an explanatory view showing a condition in the front compartment after collision.

The explanatory view of FIG. 15 similar to FIG. 6 shows a condition within the front compartment after collision of the fuel cell vehicle 310, as viewed from above in the vertical direction. If a collision load is applied diagonally from the left, front side of the vehicle, as indicated by the outlined arrow in FIG. 13, the first high-voltage unit 320 moves diagonally backward right. If the first high-voltage unit 320 moves diagonally backward right, the projecting portion 122 of the first high-voltage unit 320 collides with the suspension tower 154, and movement of the first high-voltage unit 320 is restricted.

At this time, the first high-voltage unit 320 rotates counterclockwise about a point of support where the projecting portion 122 contacts With the suspension tower 154, as indicated by the arrow in FIG. 15. Then, the protrusion 126 provided on the rear end portion of the first high-voltage unit 320 in the traveling direction on the side (left-hand side) closer to the suspension tower 155, comes into collision with the dashboard panel 156, and the first high-voltage unit 320 is stopped.

As described above, in this embodiment, the first case 125 of the first high-voltage unit 320 is provided with the protrusion 126, so that the effect of stopping the first high-voltage unit 320 at the time of collision of the vehicle can be further enhanced.

It is desirable that the protrusion 126 provided on the first case 125 of the first high-voltage unit 320 is formed to be close to an upper end portion of the first case 125 of the first high-voltage unit 320 in the vertical direction, as shown in FIG. 14. More specifically, the protrusion 126 is preferably provided above a vertically middle portion of the first case 125 of the first high-voltage unit 320. The position at which the protrusion 126 is provided is more preferably within the upper 30% range in the vertical direction of the first case 125 of the first high-voltage unit 320, and further preferably within the 20% range. With the protrusion 126 thus provided close to the upper end of the first case 125 of the first high-voltage unit 320, even when the first high-voltage unit 320 is dug into the dashboard panel 156 at the time of collision of the vehicle, the vertical position or level of digging of the first high-voltage unit 320 can be made higher. On the vehicle cabin VI side of the dashboard panel 156, equipment, devices, etc. are placed, and a larger distance is secured between an occupant within the vehicle cabin VI and the dashboard panel 156, on the upper side in the vertical direction. Therefore, the occupant protection performance of the fuel cell vehicle 310 can be enhanced by setting the position at which the first high-voltage unit 320 is dug into the dashboard panel 156 at the time of collision, to a higher level.

It is desirable that the first high-voltage unit is provided with the protrusion 126 shown in the third embodiment, along with the chamfered portion 124 shown in the second embodiment, because the respective effects as described above can be obtained.

D. FOURTH EMBODIMENT

From the standpoint of reduction in the weight of the first case 125 of the first high-voltage unit, it is desirable to reduce the weight of the projecting portion 122. In order to reduce the weight of the projecting portion 122, the projecting portion 122 may have a hollow structure, for example. Also, in order to further increase the strength of the projecting portion 122, it is desirable to form reinforcement ribs for reinforcing the hollow structure, in the interior of the hollow projecting portion 122. This arrangement will be described below as a fourth embodiment.

Figure 16:
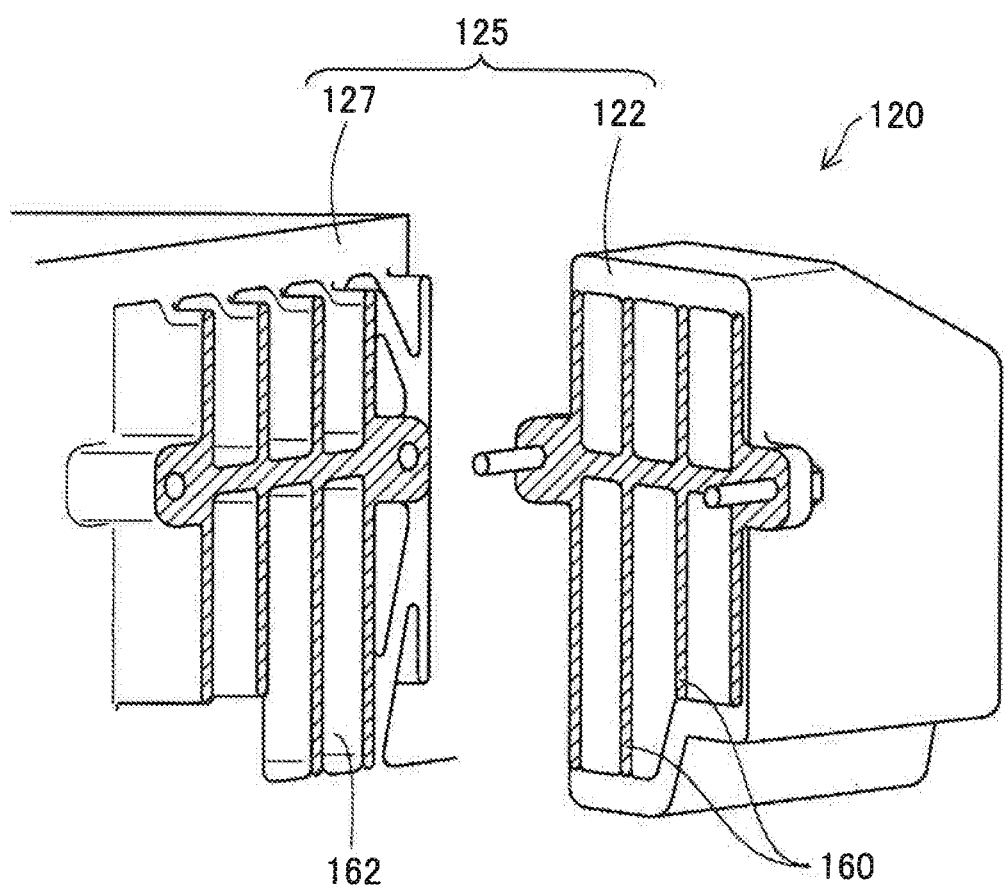
FIG. 16 is an explanatory view showing a first case of which a projecting portion and a body portion are formed as separate bodies.

FIG. 16 shows one example of the first case 125 that is included in the first high-voltage unit 120, and consists of the projecting portion 122 and the body portion 127 as separate bodies. FIG. 16 is an exploded, perspective view showing a condition in which the projecting portion 122 is detached from the body portion 127, and joint surfaces of these portions 122, 127 are opposed to each other. In the fourth embodiment, the same reference numerals are assigned to portions or components common to the first embodiment, and detailed description of the portions or components will not be provided.

In the first case 125 of FIG. 16, first reinforcement ribs 162 that protrude in the projecting direction of the projecting portion 122 are formed on a connecting portion of an outer surface of the body portion 127 which contacts with the projecting portion 122. In the first case 125, the projecting portion 122 has a hollow structure. Then, second reinforcement ribs 160 for reinforcing the hollow projecting portion 122 are formed in the interior of the projecting portion 122. The second reinforcement ribs 160 are provided in parallel with the projecting direction of the projecting portion 122, and divide space inside the projecting portion 122 into a plurality of sections. When the projecting portion 122 is attached to the body portion 127, end faces of the first reinforcement ribs 162 formed on the body portion 127 contact with end faces of the second reinforcement ribs 160 formed on the projecting portion 122. In FIG. 16, hatched areas indicate mutually contacting parts of the first reinforcement ribs 162 and the second reinforcement ribs 160. As shown in FIG. 16, in the connecting portion of the body portion 127 and the projecting portion 122, the mutually contacting end faces of the first reinforcement ribs 162 and the second reinforcement ribs 160 are identical in shape with each other. Namely, the end faces of the first reinforcement ribs 162 and the end faces of the second reinforcement ribs 160 are formed in inverted shapes that coincide with each other when the first reinforcement ribs 162 and the second reinforcement ribs 160 are supposed on each other.

Thus, the provision of the first reinforcement ribs 162 and the second reinforcement ribs 160 makes it possible to increase the strength of the projecting portion 122, and also increase the strength of the connecting portion of the projecting portion 122 and the body portion 127. It is generally known that the strength of a plate provided with ribs is equivalent to or higher than that in the case where the thickness of the plate is increased. Therefore, with the first reinforcement ribs 162 provided on the body portion 127, it is possible to increase the strength of the connecting portion of the body portion 127 and the projecting portion 122, while suppressing increase of the weight of the first case 125. Also, with the second reinforcement ribs 160 provided in the projecting portion 122, it is possible to increase the strength of the projecting portion 122, while suppressing increase of the weight of the projecting portion 122.

Further, in FIG. 16, the end faces of the first reinforcement ribs 162 and the end faces of the second reinforcement ribs 160 are identical in shape with each other. Therefore, when the projecting portion 122 collides with the suspension tower 154, the force received from the suspension tower 154 can be more efficiently transmitted from the projecting portion 122 to the body portion 127 side, and the effect of stopping the first high-voltage unit 120 can be enhanced.

E. MODIFIED EXAMPLES

Modified Example 1

In each of the illustrated embodiments, the first high-voltage unit includes the DC/DC converter (FDC) 115 and the inverters 141, 143, as the first high-voltage devices, and the second high-voltage unit 130 includes the DC/DC converter (BDC) 134 and the inverters 132, 137, as the second high-voltage devices. However, a different arrangement may be employed. For example, a different combination of high-voltage devices, which is different from those of the above embodiments, may be placed in each of the first high-voltage unit and the second high-voltage unit 130. Each of the first high-voltage unit and the second high-voltage unit 130 is only required to store one or more high-voltage device(s) that is/are desired to be prevented from being exposed when the vehicle receives an impact, in its case. When two or more high-voltage devices are stored in each of the first high-voltage unit and the second high-voltage unit 130 as in the above embodiments, the weight of the system as a whole involving the high-voltage devices can be reduced, as compared with the case where the respective high-voltage devices are stored in different cases.

For example, the first high-voltage unit may further include the fuel cell 110, in addition to the DC/DC converter (FDC) 115 and the inverters 141, 143. In another example, the first high-voltage unit may include only the fuel cell 110, as the first high-voltage device. However, it is preferable that the fuel cell 110, and other high-voltage devices that are connected to the fuel cell 110 and receive electric power from the fuel cell 110 are placed in the same high-voltage unit, because high-voltage wires can be shortened, and the wiring structure can be simplified.

In each of the illustrated embodiments, the fuel cell 110 is located below the first high-voltage unit in the front compartment such that the first high-voltage unit is superposed on the fuel cell 110. However, a different arrangement may be employed. For example, the fuel cell 110 may not be included in either of the first high-voltage unit and the second high-voltage unit 130, but may be placed below the floor of the vehicle cabin VI. In this case, too, substantially the same effect of curbing damage of the second high-voltage unit 130 can be obtained, if the first high-voltage unit and the second high-voltage unit 130 placed in the front compartment satisfy substantially the same positional relationship as that of the above embodiments.

Further, the first high-voltage unit and the second high-voltage unit 130 may store low-voltage devices having lower operating voltages in their cases, as well as the high-voltage devices.

Modified Example 2

When the first high-voltage unit or the second high-voltage unit 130 stores two or more high-voltage devices, the body portion of the case included in the first high-voltage unit or the second high-voltage unit 130 may be divided into two or more spaces. Then, different high-voltage devices may be placed in the respective spaces. For example, in the first high-voltage unit, the fuel cell 110, DC/DC converter (FDC) 115, and the inverters 141, 143 may be placed as the first high-voltage devices, and the respective devices may be placed in different spaces into which the interior of the body portion 127 is divided. With this arrangement, two or more high-voltage devices are placed close to each other in a single case, so that high-voltage wires that connect the high-voltage devices with each other can be shortened, and the wiring structure can be simplified.

Modified Example 3

While the second high-voltage unit 130 is located between the suspension tower 154 and the dashboard panel 156 in each of the illustrated embodiments, a different arrangement may be employed. The second high-voltage unit 130 may be located on either the left-hand side or the right-hand side, and may be located between the suspension tower 155 and the dashboard panel 156. When the projecting portion 122 is provided on the first case 125 of the first high-voltage unit so as to project toward the side on which the second high-voltage unit 130 is located, substantially the same effect as that of the above embodiments, namely, the effect of curbing damage of the second high-voltage unit 130 at the time of collision of the vehicle, can be obtained.

Also, two second high-voltage units 130 may be provided, and one of the second high-voltage units 130 may be placed between the suspension tower 154 and the dashboard panel 156, while the other may be placed between the suspension tower 155 and the dashboard panel 156. In this case, a pair of projecting portions 122 may be provided on the first case 125 of the first high-voltage unit so as to project to the right and the left. In this case, it is desirable to provide right and left chamfered portions 124, too. It is also desirable to provide right and left protrusions 126.

Modified Example 4

In the fuel cell vehicles 10, 210, 310, the power supply system for driving the drive motor 136 may be configured differently from that of the embodiments. For example, the drive motor 136 may not be supplied with electric power from both the fuel cell 110 and the high-voltage battery 140, but may be supplied with electric power from only one of the fuel cell 110 and the high-voltage battery 140.

It is to be understood that this disclosure is not limited to the embodiments and modified examples as described above, but may be embodied with various arrangements, without departing from the principle of the disclosure. For example, the technical features in the embodiments and modified examples, which correspond to the technical features described in "SUMMARY", may be replaced or combined as appropriate, so as to solve a part or all of the problems as described above, or achieve a part or all of the effects as described above. If any of the technical features is not described as an essential one in this specification, the feature may be deleted as appropriate.

What is claimed is:

1. A fuel cell vehicle installed with a fuel cell, the fuel cell vehicle comprising:
    a first high-voltage unit having a first high-voltage device and a first case, the first case including a body portion having a space in which the first high-voltage device is stored, and a projecting portion that projects from an outer surface of the body portion; and
    a second high-voltage unit having a second high-voltage device, the first high-voltage unit and the second high-voltage unit being housed in a front compartment of the fuel cell vehicle, wherein:
    the first high-voltage unit is located between a pair of suspension towers, and between a dashboard panel and a front bumper, the suspension towers supporting upper end portions of front suspensions that support front wheels of the fuel cell vehicle;
    the second high-voltage unit is located in a space between one of the suspension towers and the dashboard panel; and
    the projecting portion projects toward the one of the suspension towers, and at least a part of the projecting portion is located on a front side in a traveling direction of the fuel cell vehicle, relative to a straight line connecting center axes of the suspension towers, as viewed from a top of the vehicle.

2. The fuel cell vehicle according to claim 1, wherein the first case has a chamfered portion in a rear end portion as viewed in the traveling direction, on a first side close to the one of the suspension towers, the chamfered portion being located inside a shape provided by extending side faces of the first case close to the first side of the rear end portion.

3. The fuel cell vehicle according to claim 2, wherein the chamfered portion is provided at a corner portion of the first case that is closest to the second high-voltage unit.

4. The fuel cell vehicle according to claim 1, wherein the first case further includes a protrusion that protrudes rearward in the traveling direction, the protrusion being located in a rear end portion of the first case as viewed in the traveling direction, on a second side close to the other of the suspension towers.

5. The fuel cell vehicle according to claim 4, wherein the protrusion is provided above a vertically middle portion of the first case.

6. The fuel cell vehicle according to claim 1, wherein the projecting portion is provided at a position that overlaps, in a horizontal direction, with a region closest to the first high-voltage unit, in an upper-end corner portion of the one of the suspension towers having a columnar shape.

7. The fuel cell vehicle according to claim 1, wherein the projecting portion includes a distal end portion having a flat surface parallel to the traveling direction and a vertical direction.

8. The fuel cell vehicle according to claim 1, wherein the projecting portion is made of aluminum or an aluminum alloy.

9. The fuel cell vehicle according to claim 1, wherein the projecting portion and the body portion are separate members.

10. The fuel cell vehicle according to claim 9, wherein:
    the projecting portion has a hollow structure, and is provided on a side face of the first case which is opposed to the one of the suspension towers;

a connecting portion for contact with the projecting portion is provided on an outer surface of the body portion, and first reinforcement ribs that protrude in a projecting direction of the projecting portion are provided in the connecting portion;

second reinforcement ribs configured to reinforce the hollow projecting portion are provided inside the projecting portion; and end faces of the first reinforcement ribs are in contact with end faces of the second reinforcement ribs in the connecting portion, the end faces of the first reinforcement ribs being identical in shape with the end faces of the second reinforcement ribs.

11. The fuel cell vehicle according to claim 1, wherein the first high-voltage device included in the first high-voltage unit comprises a plurality of first high-voltage devices including the fuel cell, and a high-voltage device that is supplied with electric power generated by the fuel cell.

* * * * *